US012200431B2

(12) United States Patent
Terashima et al.

(10) Patent No.: US 12,200,431 B2
(45) Date of Patent: Jan. 14, 2025

(54) SOUND PICKUP DEVICE

(71) Applicant: Panasonic Intellectual Property Corporation of America, Torrance, CA (US)

(72) Inventors: Yuki Terashima, Osaka (JP); Toshiyuki Matsumura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 186 days.

(21) Appl. No.: 17/813,199

(22) Filed: Jul. 18, 2022

(65) Prior Publication Data

US 2022/0353606 A1 Nov. 3, 2022

Related U.S. Application Data

(63) Continuation of application No. PCT/JP2020/038239, filed on Oct. 9, 2020.

(30) Foreign Application Priority Data

Jan. 27, 2020 (JP) ................................ 2020-010863

(51) Int. Cl.
*H04R 1/28* (2006.01)
*H04R 19/04* (2006.01)

(52) U.S. Cl.
CPC ........... *H04R 1/2807* (2013.01); *H04R 19/04* (2013.01); *H04R 2201/003* (2013.01)

(58) Field of Classification Search
CPC ........ H04R 1/222; H04R 1/28; H04R 1/2807; H04R 1/2823; H04R 1/2838; H04R 1/2846; H04R 1/2869
See application file for complete search history.

(56) References Cited

U.S. PATENT DOCUMENTS 3,819,879 A 6/1974 Baechtold
7,280,855 B2 * 10/2007 Hawker ................. H04M 1/03 455/575.8

(Continued)

FOREIGN PATENT DOCUMENTS

JP S48-070527 A 9/1973
JP 6540498 B2 7/2019

(Continued)

OTHER PUBLICATIONS

International Search Report (including English Language Translation), mailed Dec. 8, 2020, by the Japan Patent Office (JPO), in International Application No. PCT/JP2020/038239.

*Primary Examiner* — Ryan Robinson
(74) *Attorney, Agent, or Firm* — Greenblum & Bernstein, P.L.C.

(57) ABSTRACT

A sound pickup device includes a diaphragm that vibrates according to an acoustic pressure of input sound, an acoustic member having a sound channel formed to guide sound to the diaphragm, and a Helmholtz resonator having an opening formed in a wall surface surrounding the sound channel, in which the diaphragm is disposed inside a microphone in which a sound hole is formed, the acoustic member includes: a first substrate that has a through hole formed at the same position as the sound hole, and is attached to the microphone; and a second substrate that has the sound channel formed at a position corresponding to the through hole, and is attached to the first substrate.

12 Claims, 10 Drawing Sheets

(56) References Cited

U.S. PATENT DOCUMENTS

| | | | | | |
|---|---|---|---|---|---|
| 9,351,062 | B2 * | 5/2016 | Inoda | H04R 1/38 | |
| 10,805,716 | B2 * | 10/2020 | Zheng | H04R 19/04 | |
| 11,051,094 | B2 * | 6/2021 | Schultz | H04R 1/083 | |
| 11,653,143 | B2 * | 5/2023 | Bradt | H04R 1/2869 | 381/345 |
| 11,800,278 | B2 * | 10/2023 | Christensen | H04R 1/2884 | |
| 11,910,154 | B2 * | 2/2024 | Neumaier | H04R 1/04 | |
| 2013/0070950 | A1 * | 3/2013 | Chen | H04R 1/222 | 381/353 |
| 2016/0014530 | A1 * | 1/2016 | Gao | H04R 19/005 | 438/51 |
| 2019/0387309 | A1 | 12/2019 | Mackey et al. | | |
| 2021/0400392 | A1 * | 12/2021 | Zhang | H04R 9/02 | |

FOREIGN PATENT DOCUMENTS

| | | | | |
|---|---|---|---|---|
| WO | WO-9851122 | A1 * | 11/1998 | H04M 1/03 |
| WO | 2017/068711 | A1 | 4/2017 | |

* cited by examiner

SOUND PICKUP DEVICE

TECHNICAL FIELD

The present disclosure relates to a technique for sound pickup using a microphone.

BACKGROUND ART

In recent years, micro electro mechanical systems (MEMS) microphones have become widespread in place of electret condenser microphones (ECM).

The MEMS microphones can be downsized and have high heat resistance, which allows reflow mounting. Therefore, MEMS microphones are used in sound pickup devices of smartphones, smart speakers, and the like.

With downsizing of diaphragms, the MEMS microphones, which have sensitivity up to an ultrasonic band of about 100 kHz, are used for ultrasonic sensing, high-resolution music recording, or the like. However, the MEMS microphone may have a peak in an ultrasonic band due to acoustic factors (a sound hole, front volume, and resonance of a diaphragm). Therefore, the MEMS microphone has a problem that a flat frequency characteristic cannot be obtained due to a peak generated in the ultrasonic band.

In addition, a maximum signal level of a microphone amplifier, an analog-digital conversion circuit, or a digital arithmetic processing device needs to be designed according to a peak frequency. Therefore, the MEMS microphone has a problem that an SN ratio at a frequency other than the peak frequency is deteriorated.

In order to solve this problem, for example, an electronic apparatus disclosed in Patent Literature 1 includes a housing provided with a hole, a substrate disposed in the housing, a microphone disposed at a position corresponding to the hole of the housing, a partition wall disposed between the substrate and the housing to surround a periphery of the microphone, and a sound absorbing material disposed in a space partitioned by the substrate, the partition wall, and the housing to cover the microphone.

However, in the above-described conventional technique, sensitivity may decrease in the whole frequency band, so that further improvement is required.

CITATION LIST

Patent Literature

Patent Literature 1: Japanese Patent No. 6540498

SUMMARY OF INVENTION

An object of the present disclosure, which has been made to solve the above problem, is to provide a technique that enables a peak generated in an ultrasonic band to be reduced and a decrease in sensitivity in the whole frequency band to be prevented.

A sound pickup device according to one aspect of the present disclosure includes: a diaphragm that vibrates according to an acoustic pressure of input sound; an acoustic member having a sound channel formed for guiding sound to the diaphragm; and a resonator having an opening formed in a wall surface surrounding the sound channel.

According to the present disclosure, it is possible to reduce a peak generated in an ultrasonic band and to prevent a decrease in sensitivity in the whole frequency band.

DESCRIPTION OF EMBODIMENTS

Knowledge Underlying the Present Disclosure

Figure 1:
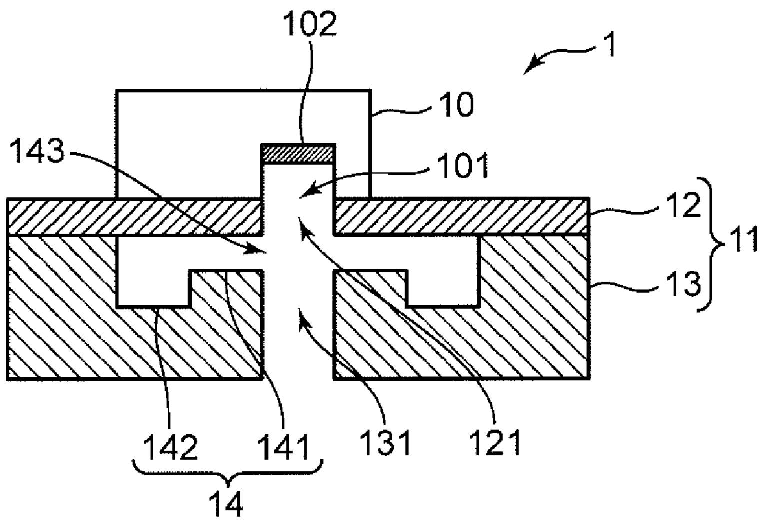
FIG. 1 is a sectional view illustrating a configuration of a sound pickup device according to a first embodiment of the present disclosure.

In the above-described conventional electronic apparatus, since the microphone is covered with the sound absorbing material, sensitivity may decrease in the whole frequency band. In addition, since the sensitivity of the sound absorbing material may be significantly reduced at higher frequencies, it is difficult to pick up sound with high sensitivity in an ultrasonic band.

In order to solve the above problems, a sound pickup device according to one aspect of the present disclosure includes: a diaphragm that vibrates according to an acoustic pressure of input sound; an acoustic member having a sound channel formed to guide sound to the diaphragm; and a resonator having an opening formed in a wall surface surrounding the sound channel.

According to this configuration, the resonator has the opening formed in the wall surface surrounding the sound channel for guiding sound to the diaphragm. The sound passing through the sound channel enters the resonator from the opening. The resonator has a peak sound absorptivity near its resonance frequency. Therefore, by designing the resonator so that the resonance frequency becomes a specific peak frequency generated in an ultrasonic band, a peak generated in the ultrasonic band can be reduced, and a frequency characteristic can be made substantially flat. In addition, since the sound channel for guiding sound to the diaphragm is not provided with a sound absorbing material that absorbs sound, it is possible to prevent sensitivity from deteriorating in the whole frequency band.

Furthermore, in the sound pickup device, the resonator may be a Helmholtz resonator.

According to this configuration, a peak of a desired frequency can be easily reduced by changing the shape of the Helmholtz resonator.

Furthermore, in the above-described sound pickup device, the diaphragm may be disposed inside a microphone in which a sound hole is formed, the acoustic member may include: a first acoustic member that has a through hole formed at a same position as the sound hole, and is attached to the microphone; and a second acoustic member that has the sound channel formed at a position corresponding to the through hole, and is attached to the first acoustic member, and the resonator may be formed in a direction perpendicular to the wall surface surrounding the sound channel.

According to this configuration, sound entering from an entrance of the sound channel of the second acoustic member passes through the sound channel, the through hole of the first acoustic member, and the sound hole of the microphone, and is guided to the diaphragm in the microphone. Meanwhile, the sound entering through the entrance of the sound channel is also guided to the inside of the resonator formed in the direction perpendicular to the wall surface surrounding the sound channel. Therefore, a peak generated in an ultrasonic band can be reduced by the resonator formed in the second acoustic member, and a frequency characteristic can be made substantially flat.

Furthermore, in the above-described sound pickup device, the diaphragm may be disposed inside a microphone in which a sound hole is formed, the sound pickup device may further include: a substrate mounted with the microphone such that a surface of the microphone opposed to a surface on which the sound hole is formed is in contact with the substrate, in which the acoustic member may include: a first acoustic member that has a through hole formed at a same position as the sound hole, and is attached to the microphone; and a second acoustic member that has the sound channel formed at a position corresponding to the through hole, and is attached to the first acoustic member, and the resonator may be formed in a direction perpendicular to the wall surface surrounding the sound channel.

According to this configuration, even in a top port type microphone in which a sound hole is formed in a surface opposed to a surface in contact with a substrate, a peak generated in an ultrasonic band can be reduced by the resonator formed in the second acoustic member, and a frequency characteristic can be made substantially flat.

Furthermore, in the above-described sound pickup device, the sound channel of the second acoustic member may be formed to be tapered from an input port of the sound toward the inside of the sound channel.

According to this configuration, since the sound channel is formed to be tapered from the input port of the sound toward the inside of the sound channel, the sound channel is widened to reduce a change in a high-frequency characteristic of the sound.

Furthermore, in the above-described sound pickup device, the diaphragm may be disposed inside a microphone in which a sound hole is formed, the acoustic member may be disposed between the sound hole and the diaphragm, and the resonator may be formed in a direction perpendicular to the wall surface surrounding the sound channel.

According to this configuration, since the resonator is formed inside the microphone, the sound pickup device can be downsized.

Furthermore, in the above-described sound pickup device, the resonator may include a neck portion formed in a periphery of the sound channel and having a space of a first volume; and a cavity portion formed in a periphery of the neck portion and having a space of a second volume larger than the first volume.

According to this configuration, a peak of a desired frequency can be reduced by designing the first volume of the neck portion and the second volume of the cavity portion so that a resonance frequency approaches a peak frequency to be reduced.

Furthermore, in the above-described sound pickup device, the neck portion may be an annular space surrounding the periphery of the sound channel, and the cavity portion may be an annular space surrounding the periphery of the neck portion.

According to this configuration, since the neck portion is formed by cutting the periphery of the sound channel into an annular shape, and the cavity portion is formed by further cutting the periphery of the neck portion into an annular shape, the resonator can be easily formed.

Furthermore, in the above-described sound pickup device, the neck portion may be a tubular space radially extending from the wall surface of the sound channel, and the cavity portion may be an annular space surrounding the periphery of the neck portion.

According to this configuration, it is possible to improve a degree of freedom in designing a resonance frequency and sharpness of a signal characteristic of the resonance frequency by changing the number of the neck portions. In addition, since the resonator includes the plurality of neck portions having openings with different cross-sectional areas, peaks of a plurality of frequencies can be reduced.

Furthermore, in the above-described sound pickup device, the neck portion may be a tubular space radially extending from the wall surface of the sound channel, and the cavity portion may be provided individually for the neck portion.

According to this configuration, it is possible to improve the degree of freedom in designing a resonance frequency and sharpness of a signal characteristic of the resonance frequency by changing the number of the neck portions and the number of cavity portions. In addition, since the resonator includes the plurality of neck portions having openings with different cross-sectional areas, peaks of a plurality of frequencies can be reduced. In addition, since the resonator includes the plurality of cavity portions having different volumes, peaks of a plurality of frequencies can be reduced.

Furthermore, the above-described sound pickup device may further include a sound absorbing material disposed inside at least one of the neck portion and the cavity portion.

According to this configuration, sharpness of a signal characteristic of a resonance frequency can be controlled by disposing the sound absorbing material inside at least one of the neck portion and the cavity portion of the resonator.

Furthermore, in the above-described sound pickup device, the resonator may include a first resonator formed in a direction perpendicular to the wall surface surrounding the sound channel; and a second resonator formed outside the first resonator and having an opening connected to the first resonator.

According to this configuration, since the first resonator and the second resonator having different resonance frequencies are formed, peaks of a plurality of frequencies can be reduced.

Furthermore, in the above-described sound pickup device, the microphone may be a micro electro mechanical systems (MEMS) microphone.

According to this configuration, even in the MEMS microphone that can be downsized and can be reflow-mounted, a peak generated in an ultrasonic band can be reduced by the resonator, and a frequency characteristic can be made substantially flat.

Furthermore, in the above-described sound pickup device, the diaphragm may be disposed inside a microphone in which a sound hole is formed, the acoustic member may include: a first acoustic member that has the sound channel formed at a position corresponding to the sound hole, and is attached to the microphone; and a second acoustic member that has a through hole formed at a same position as an input port of the sound of the sound channel, and is attached to the first acoustic member, and the resonator may be formed in a direction perpendicular to the wall surface surrounding the sound channel.

According to this configuration, the sound entering from the through hole of the second acoustic member passes through the through hole of the second acoustic member, the sound channel of the first acoustic member, and the sound hole of the microphone, and is guided to the diaphragm in the microphone. Meanwhile, the sound entering through the entrance of the sound channel is also guided to the inside of the resonator formed in the direction perpendicular to the wall surface surrounding the sound channel. Therefore, a peak generated in an ultrasonic band can be reduced by the resonator formed in the first acoustic member, and a frequency characteristic can be made substantially flat.

Hereinafter, embodiments of the present disclosure will be described with reference to the accompanying drawings. Note that the following embodiments are examples embodying the present disclosure and do not limit a technical scope of the present disclosure.

First Embodiment

FIG. 1 is a sectional view illustrating a configuration of a sound pickup device according to a first embodiment of the present disclosure.

A sound pickup device 1 illustrated in FIG. 1 includes a microphone 10, an acoustic member 11, and a Helmholtz resonator 14.

The microphone 10 is an MEMS microphone. The microphone 10 includes an electronic component and a cover that covers the electronic component. A sound hole 101 for guiding sound into the microphone 10 is formed in the cover. The electronic component includes, for example, a diaphragm 102 and an audio amplifier (not illustrated). The microphone 10 includes the diaphragm 102. The diaphragm 102 vibrates according to an acoustic pressure of input sound. The sound hole 101 has, for example, a circular cross section.

An MEMS microphone in which the sound hole 101 is formed on a first substrate 12 side in a lower portion of the microphone 10 is referred to as a bottom-port type MEMS microphone. Further, an MEMS microphone in which the sound hole 101 is formed in a cover in an upper portion of the microphone 10 is referred to as a top port type MEMS microphone. The microphone 10 in the first embodiment is a bottom port type MEMS microphone.

The diaphragm 102 is disposed inside the microphone 10 in which the sound hole 101 is formed. The diaphragm 102 vibrates by an acoustic pressure of sound input from the sound hole 101. The diaphragm 102 configures a capacitor together with a back electrode (back plate) arranged to be opposed to the diaphragm. When the diaphragm 102 vibrates by the acoustic pressure, capacitance of the capacitor changes. The changed capacitance is converted into an electric signal. The converted electric signal is amplified by the audio amplifier and output to the outside.

The acoustic member 11 has a sound channel 131 formed to guide sound to the diaphragm 102. The acoustic member 11 includes the first substrate 12 and a second substrate 13.

The first substrate 12 has a through hole 121 formed at the same position as the sound hole 101, and is attached to the microphone 10. Note that the first substrate 12 is an example of a first acoustic member. The first substrate 12 may be a rigid substrate or a flexible substrate. The microphone 10 is mounted on one surface of the first substrate 12. The through hole 121 has, for example, a circular cross section. The through hole 121 preferably has the same diameter as a diameter of the sound hole 101 of the microphone 10.

The second substrate 13 has a sound channel 131 formed at a position corresponding to the through hole 121, and is attached to the first substrate 12. Note that the second substrate 13 is an example of a second acoustic member. The second substrate 13 may be a housing of an electric apparatus including the sound pickup device 1. In addition, the second substrate 13 may be an elastic member for suppressing vibration. The other surface of the first substrate 12 is bonded to a surface of the second substrate 13 on which the Helmholtz resonator 14 is formed.

The Helmholtz resonator 14 has an opening 143 formed in a wall surface surrounding the sound channel 131. The Helmholtz resonator 14 is formed in a direction perpendicular to the wall surface surrounding the sound channel 131. The Helmholtz resonator 14 is an example of a resonator.

The Helmholtz resonator 14 includes a neck portion 141 and a cavity portion 142. The neck portion 141 is formed in a periphery of the sound channel 131 and has a space of a first volume. The cavity portion 142 is formed in a periphery of the neck portion 141 and has a space of a second volume larger than the first volume. The Helmholtz resonator 14 resonates with a sound of a specific frequency and reduces a peak mainly generated in an ultrasonic band. A cross-sectional area of the opening 143 of the neck portion 141, a length of the neck portion 141, and a volume of the cavity portion 142 are determined such that the peak is reduced by a resonance frequency.

The neck portion 141 is an annular space surrounding the periphery of the sound channel 131. The cavity portion 142 is an annular space surrounding the periphery of the neck portion 141.

Here, a method of forming the Helmholtz resonator 14 on the second substrate 13 will be described with reference to FIG. 2.

Figure 2:
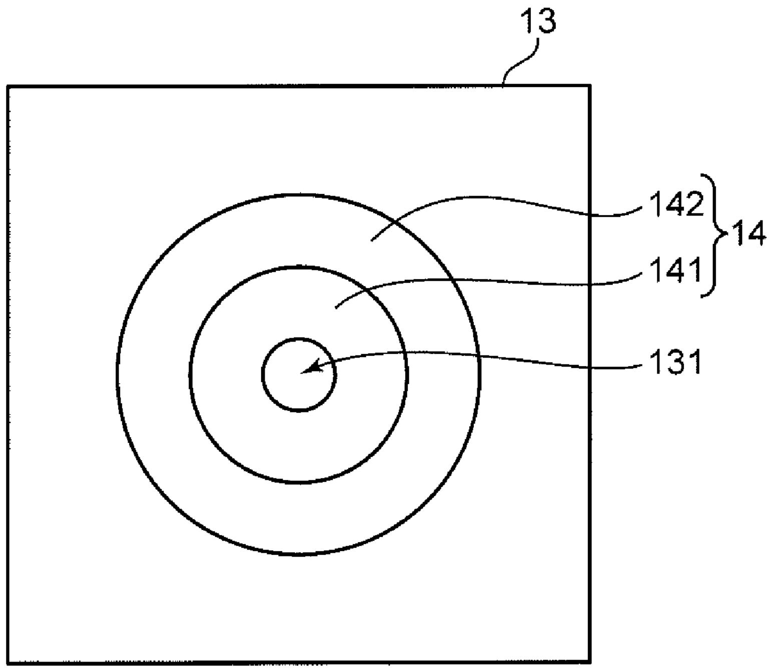
FIG. 2 is a top view of a second substrate according to the first embodiment of the present disclosure.

FIG. 2 is a top view of the second substrate according to the first embodiment of the present disclosure.

First, a through hole is formed in a thickness direction of the second substrate 13. The through hole formed in the second substrate 13 is the sound channel 131. Cross sections of an input side opening end and an output side opening end of the sound channel 131 are circular. The sound channel 131 is cylindrical. The input side opening end and the output side opening end of the sound channel 131 preferably have diameters equal to the diameter of the through hole 121 of the first substrate 12.

Next, an annular region from an outer edge of the sound channel 131 to a position corresponding to a horizontal length of the neck portion 141 is cut from a surface of the second substrate 13 to a position at a predetermined depth. Thus, the neck portion 141 is formed.

Next, an annular region from the outer edge of the neck portion 141 to a position corresponding to a horizontal length of the cavity portion 142 is cut from the surface of the second substrate 13 to a position at a predetermined depth. Thus, the cavity portion 142 is formed. Note that the depth of the cavity portion 142 from the surface of the second substrate 13 is larger than the depth of the neck portion 141 from the surface of the second substrate 13.

Note that the neck portion 141 and the cavity portion 142 of the Helmholtz resonator 14 may be formed by resin transfer processing instead of the above-described cutting processing.

Next, a surface of the first substrate 12 opposed to a surface on which the microphone 10 is mounted (i.e., the surface on which the microphone 10 is not mounted) and a surface of the second substrate 13 on which the Helmholtz resonator 14 has been formed are bonded. At this time, the first substrate 12 and the second substrate 13 are bonded to each other such that a central axis of the through hole 121 of the first substrate 12 and a central axis of the sound channel 131 of the second substrate 13 agree with each other. As a result, the Helmholtz resonator 14 is formed between the first substrate 12 and the second substrate 13.

Figure 3:
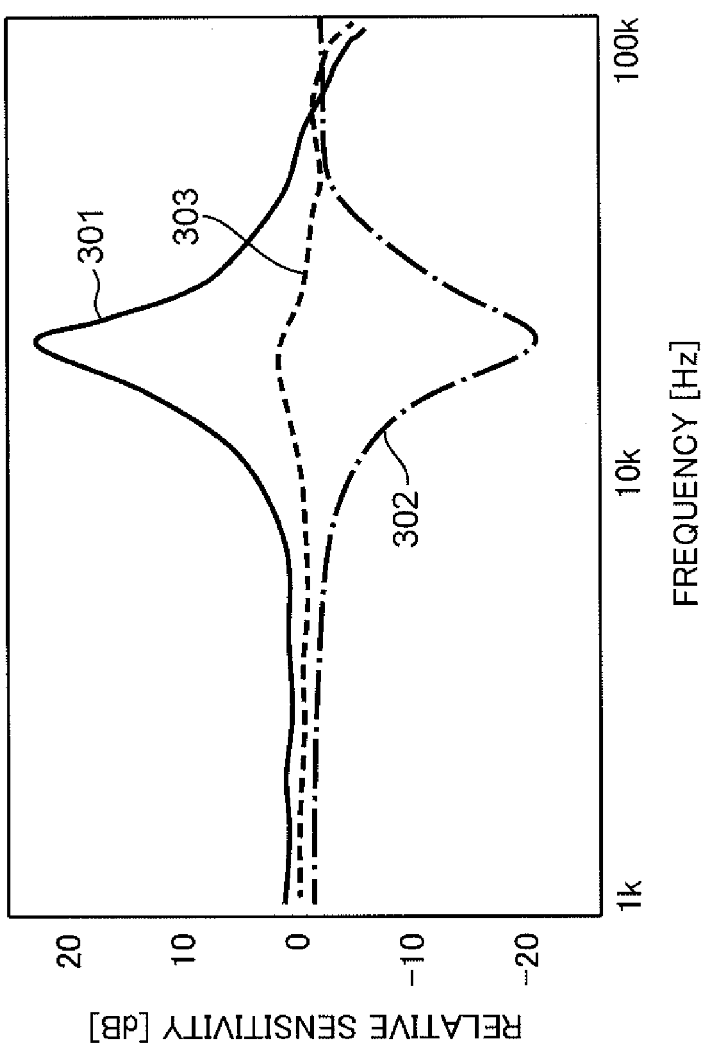
FIG. 3 is a diagram illustrating a frequency characteristic of a sound pickup device not including a second substrate, a frequency characteristic of a sound channel of the second substrate, and a frequency characteristic of a sound pickup device including the second substrate in the first embodiment of the present disclosure.

FIG. 3 is a diagram illustrating a frequency characteristic of a sound pickup device not including the second substrate, a frequency characteristic of the sound channel of the second substrate, and a frequency characteristic of a sound pickup device including the second substrate in the first embodiment of the present disclosure. In FIG. 3, the horizontal axis represents frequency, and the vertical axis represents relative sensitivity.

As illustrated in FIG. 3, a frequency characteristic 301 of the sound pickup device 1 in a case where the sound pickup device 1 does not include the second substrate 13 but includes only the first substrate 12 has a peak in an ultrasonic band of 20 kHz or more. In contrast, a frequency characteristic 302 of the sound channel 131 of the second substrate 13 including the Helmholtz resonator 14 absorbs sound of a specific frequency in the ultrasonic band of 20 kHz or more by the resonance of the Helmholtz resonator 14. Therefore, in a frequency characteristic 303 of the sound pickup device 1 in a case where the sound pickup device 1 includes the second substrate 13 including the Helmholtz resonator 14, a peak generated in the ultrasonic band of 20 kHz or more is reduced to be substantially flat.

According to the first embodiment, the Helmholtz resonator 14 has an opening 143 formed on the wall surface surrounding the sound channel 131 for guiding sound to the diaphragm 102. Sound passing through the sound channel 131 enters the Helmholtz resonator 14 from the opening 143. The Helmholtz resonator 14 has a peak sound absorptivity in the vicinity of its resonance frequency. Therefore, by designing the Helmholtz resonator 14 so that the resonance frequency becomes a specific peak frequency generated in the ultrasonic band, the peak generated in the ultrasonic band can be reduced, and the frequency characteristic can be made substantially flat. In addition, since the sound channel 131 for guiding sound to the diaphragm 102 is not provided with a sound absorbing material that absorbs sound, it is possible to prevent sensitivity from deteriorating in the whole frequency band.

Subsequently, description will be made of various modifications of the shape of the Helmholtz resonator 14 in the first embodiment.

Figure 4:
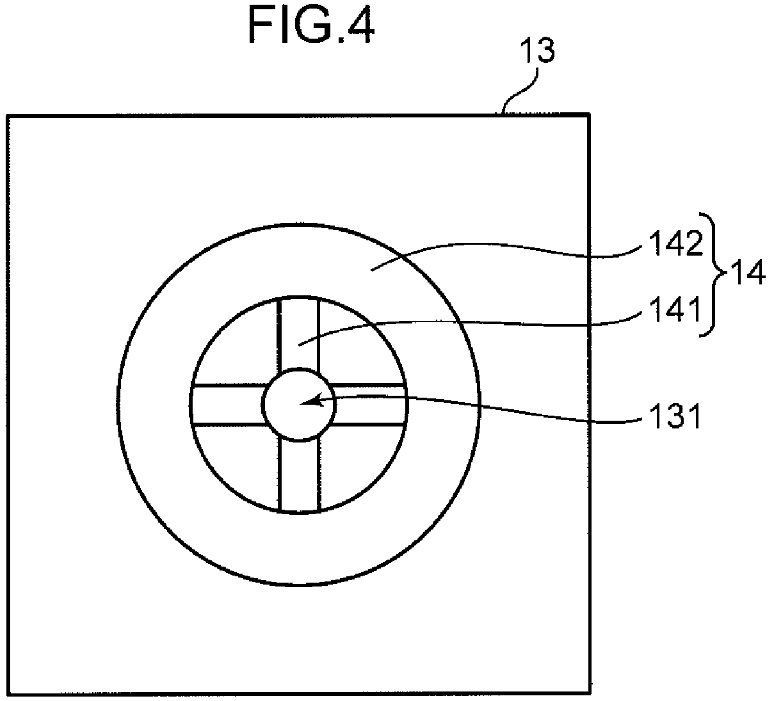
FIG. 4 is a top view of a second substrate in a first modification of the first embodiment of the present disclosure.

FIG. 4 is a top view of a second substrate according to a first modification of the first embodiment of the present disclosure.

The Helmholtz resonator 14 in the first modification of the first embodiment includes at least one neck portion 141 and a cavity portion 142. The at least one neck portion 141 is a tubular space radially extending from a wall surface of a sound channel 131. Note that the Helmholtz resonator 14 in the first modification of the first embodiment includes four neck portions 141. The cavity portion 142 is an annular space surrounding a periphery of the at least one neck portion 141. One opening end of the at least one neck portion 141 is connected to the sound channel 131, and the other opening end of the at least one neck portion 141 is connected to the cavity portion 142.

A cross-sectional shape of an opening 143 of the neck portion 141 may be quadrangular, and the neck portion 141 may have a prismatic shape. In addition, the cross-sectional shape of the opening 143 of the neck portion 141 may be circular, and the neck portion 141 may have a cylindrical shape. Furthermore, the neck portion 141 may have a fan shape that gradually expands from the opening end connected to the sound channel 131 toward the opening end connected to the cavity portion 142.

Note that the number of the neck portions 141 is not limited to four. For example, when the number of the neck portions 141 decreases, a signal characteristic of a resonance frequency becomes steep, and when the number of the neck portions 141 increases, the signal characteristic of the resonance frequency becomes gentle. Therefore, the Helmholtz resonator 14 may include the number of the neck portions 141 corresponding to sharpness (i.e., a Q value) of a signal characteristic of a peak frequency to be reduced. In addition, the Helmholtz resonator 14 may include a plurality of neck portions 141 having the openings 143 with different cross-sectional areas, according to the number of frequencies at which peaks are to be reduced.

In the first modification of the first embodiment, it is possible to improve a degree of freedom in designing a resonance frequency and sharpness of a signal characteristic of the resonance frequency by changing the number of the neck portions 141. In addition, since the Helmholtz resonator 14 includes the plurality of neck portions 141 having the openings 143 with different cross-sectional areas, peaks of a plurality of frequencies can be reduced. In addition, since an area where a first substrate 12 and a second substrate 13 are in contact with each other becomes larger, a support strength of the first substrate 12 can be increased. As a result, vibration of a microphone 10 can be suppressed. In particular, the shape of the Helmholtz resonator 14 in the first modification of the first embodiment exhibits a more remarkable effect in a case where the first substrate 12 is thin like a flexible substrate.

Figure 5:
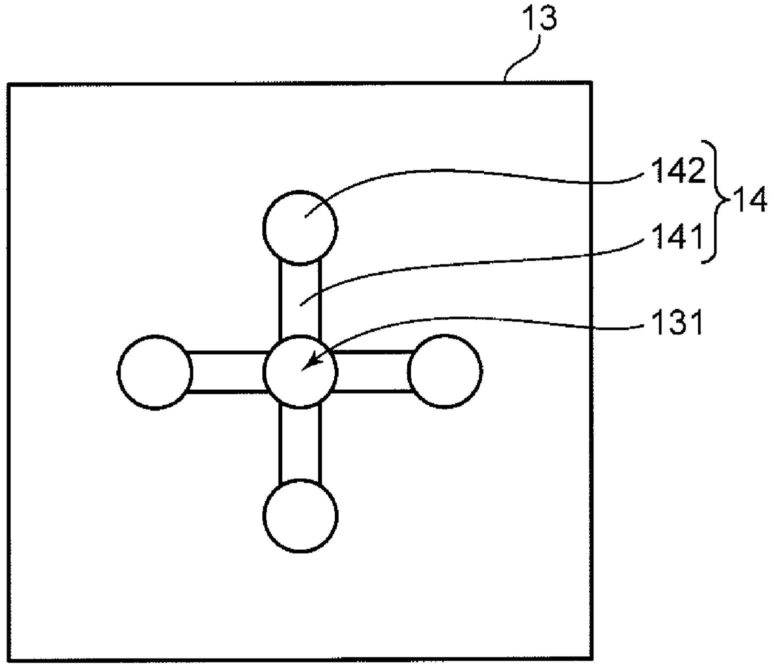
FIG. 5 is a top view of a second substrate in a second modification of the first embodiment of the present disclosure.

FIG. 5 is a top view of a second substrate according to a second modification of the first embodiment of the present disclosure.

A Helmholtz resonator 14 in the second modification of the first embodiment includes at least one neck portion 141 and at least one cavity portion 142. The at least one neck portion 141 is a tubular space radially extending from a wall surface of a sound channel 131. The at least one cavity portion 142 is provided individually for the at least one neck portion 141. Note that the Helmholtz resonator 14 according to the second modification of the first embodiment includes four neck portions 141 and four cavity portions 142. One opening end of the at least one neck portion 141 is connected to the sound channel 131, and the other opening end of the at least one neck portion 141 is connected to the cavity portion 142.

A cross-sectional shape of an opening 143 of the neck portion 141 may be quadrangular, and the neck portion 141 may have a prismatic shape. In addition, the cross-sectional shape of the opening 143 of the neck portion 141 may be circular, and the neck portion 141 may have a cylindrical shape.

A cross sectional shape of the cavity portion 142 may be quadrangular, and the cavity portion 142 may have a prismatic shape. In addition, the cross-sectional shape of the cavity portion 142 may be circular, and the cavity portion 142 may have a cylindrical shape. The cavity portion 142 may be spherical.

Note that the number of the neck portions 141 and the number of the cavity portions 142 are not limited to four. For example, when the number of the neck portions 141 and the number of the cavity portions 142 decrease, a signal characteristic of a resonance frequency becomes steep, and when the number of the neck portions 141 and the number of the cavity portions 142 increase, the signal characteristic of the resonance frequency becomes gentle. Therefore, the Helmholtz resonator 14 may include the number of the neck portions 141 and the number of the cavity portions 142 corresponding to sharpness (i.e., a Q value) of a signal characteristic of a peak frequency to be reduced. In addition, the Helmholtz resonator 14 may include a plurality of neck portions 141 having the openings 143 with different cross-sectional areas, according to the number of frequencies at which peaks are to be reduced, and may include a plurality of cavity portions 142 having different volumes.

In the second modification of the first embodiment, it is possible to improve a degree of freedom in designing a resonance frequency and sharpness of a signal characteristic of the resonance frequency by changing the number of the neck portions 141 and the number of the cavity portions 142. In addition, since the Helmholtz resonator 14 includes the plurality of neck portions 141 having the openings 143 with different cross-sectional areas, peaks of a plurality of frequencies can be reduced. In addition, since the Helmholtz resonator 14 includes the plurality of cavity portions 142 having different volumes, peaks of a plurality of frequencies can be reduced. In addition, since an area where a first substrate 12 and a second substrate 13 are in contact with each other becomes larger, a support strength of the first substrate 12 can be increased. As a result, vibration of a microphone 10 can be suppressed. In particular, the shape of the Helmholtz resonator 14 in the second modification of the first embodiment exhibits a more remarkable effect in a case where the first substrate 12 is thin like a flexible substrate.

Second Embodiment

The sound channel formed in the second substrate in the first embodiment has a cylindrical shape. In contrast, a second embodiment differs from the first embodiment in a shape of an input port of a sound channel.

Figure 6:
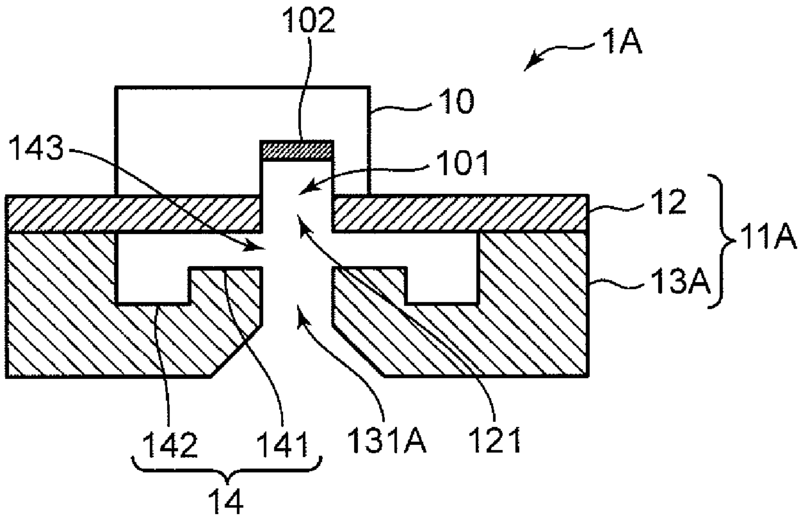
FIG. 6 is a sectional view illustrating a configuration of a sound pickup device according to a second embodiment of the present disclosure.

FIG. 6 is a sectional view illustrating a configuration of a sound pickup device according to the second embodiment of the present disclosure.

A sound pickup device 1A illustrated in FIG. 6 includes a microphone 10, an acoustic member 11A, and a Helmholtz resonator 14. In the second embodiment, the same components as those in the first embodiment are denoted by the same reference numerals, and description thereof will be omitted.

The acoustic member 11A has a sound channel 131A formed to guide sound to a diaphragm 102. The acoustic member 11A includes a first substrate 12 and a second substrate 13A.

A sound channel 131A of the second substrate 13A is formed to be tapered from an input port of sound toward the inside of the sound channel 131A.

When sound passes through a narrow sound channel, a high-frequency characteristic of the sound may change. Therefore, the sound channel 131A is formed to be tapered from the input port of sound toward the inside of the sound channel 131A, whereby the sound channel 131A is widened to reduce a change in a high-frequency characteristic of the sound.

Third Embodiment

In the first embodiment, the insides of the neck portion 141 and the cavity portion 142 of the Helmholtz resonator 14 are hollow. In contrast, in a third embodiment, a sound absorbing material is disposed inside a neck portion 141 and a cavity portion 142 of a Helmholtz resonator 14.

Figure 7:
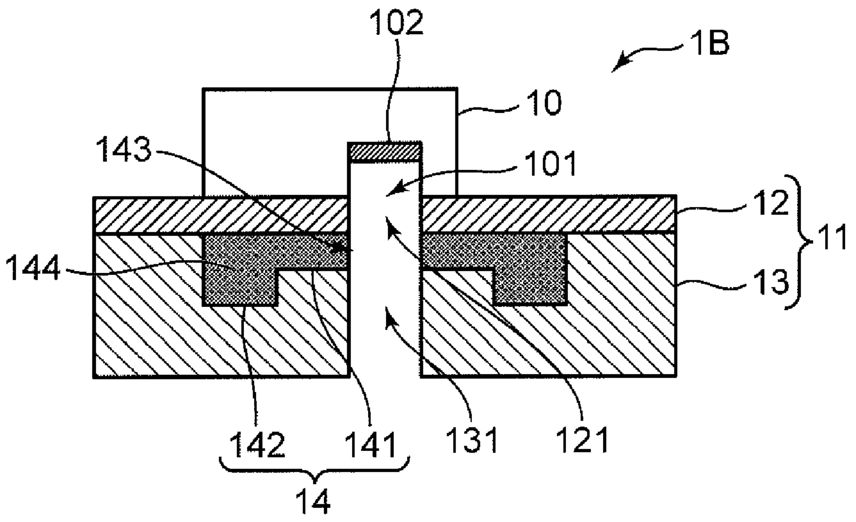
FIG. 7 is a sectional view illustrating a configuration of a sound pickup device according to a third embodiment of the present disclosure.

FIG. 7 is a sectional view illustrating a configuration of a sound pickup device according to the third embodiment of the present disclosure.

A sound pickup device 1B illustrated in FIG. 7 includes a microphone 10, an acoustic member 11, the Helmholtz resonator 14, and a sound absorbing material 144. In the third embodiment, the same components as those in the first embodiment are denoted by the same reference numerals, and description thereof will be omitted.

The sound absorbing material 144 is disposed inside at least one of the neck portion 141 and the cavity portion 142. Specifically, the sound absorbing material 144 may be disposed inside both the neck portion 141 and the cavity portion 142, may be disposed inside only the neck portion 141, or may be disposed inside only the cavity portion 142. The position where the sound absorbing material 144 is disposed may be determined according to a frequency to be reduced.

The sound absorbing material 144 is, for example, a polyurethane sponge. The sound absorbing material 144 preferably has an open cell structure. A material of the sound absorbing material 144 may be determined according to a frequency to be reduced. Note that a shape of the Helmholtz resonator 14 in the third embodiment is the same as the shape of the Helmholtz resonator 14 in the first embodiment.

According to the third embodiment, since the sound absorbing material 144 is disposed inside the Helmholtz resonator 14, it is possible to control sharpness of a signal characteristic of a resonance frequency.

Note that a sound channel 131 of a second substrate 13 in the third embodiment may be formed to be tapered from an input port of sound toward the inside of the sound channel 131 similarly to the second embodiment.

Fourth Embodiment

In the first embodiment, the Helmholtz resonator is formed in the periphery of the sound channel. In contrast, in a fourth embodiment, a first Helmholtz resonator is formed in a periphery of a sound channel, and a second Helmholtz resonator is further formed in a periphery of the first Helmholtz resonator.

Figure 8:
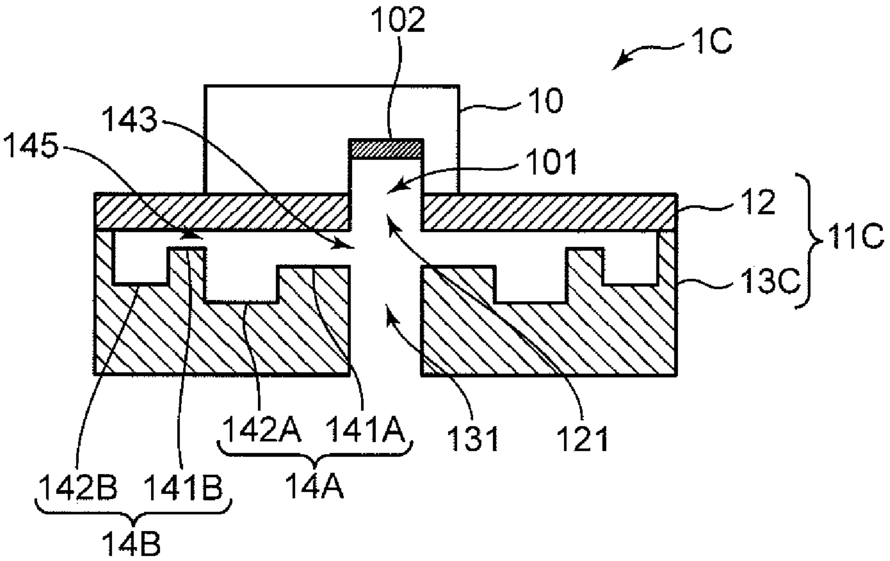
FIG. 8 is a sectional view illustrating a configuration of a sound pickup device according to a fourth embodiment of the present disclosure.

FIG. 8 is a sectional view illustrating a configuration of a sound pickup device according to the fourth embodiment of the present disclosure.

A sound pickup device 1C illustrated in FIG. 8 includes a microphone 10, an acoustic member 11C, a first Helmholtz resonator 14A, and a second Helmholtz resonator 14B. In the fourth embodiment, the same components as those in the first embodiment are denoted by the same reference numerals, and description thereof will be omitted.

The acoustic member 11C has a sound channel 131 formed to guide sound to a diaphragm 102. The acoustic member 11C includes a first substrate 12 and a second substrate 13C.

The first Helmholtz resonator 14A and the second Helmholtz resonator 14B are formed in the second substrate 13C. The first Helmholtz resonator 14A and the second Helmholtz resonator 14B have resonance frequencies different from each other.

The first Helmholtz resonator 14A is formed in a direction perpendicular to a wall surface surrounding the sound channel 131.

The first Helmholtz resonator 14A has an opening 143 formed in the wall surface surrounding the sound channel 131. The first Helmholtz resonator 14A is formed in a direction perpendicular to a wall surface surrounding the sound channel 131. The first Helmholtz resonator 14A is an example of a first resonator.

The first Helmholtz resonator 14A includes a first neck portion 141A and a first cavity portion 142A. The first neck portion 141A is formed in a periphery of the sound channel 131 and has a space of a first volume. The first cavity portion 142A is formed in a periphery of the first neck portion 141A and has a space of a second volume larger than the first volume. The first Helmholtz resonator 14A resonates with a sound of a specific frequency and reduces a peak mainly generated in an ultrasonic band. A cross-sectional area of the opening 143 of the first neck portion 141A, a length of the first neck portion 141A, and a volume of the first cavity portion 142A are determined such that the peak is reduced by a resonance frequency.

The first neck portion 141A is an annular space surrounding the periphery of the sound channel 131. The first cavity portion 142A is an annular space surrounding the periphery of the first neck portion 141A.

The second Helmholtz resonator 14B is formed outside the first Helmholtz resonator 14A and has an opening 145 connected to the first Helmholtz resonator 14A.

The second Helmholtz resonator 14B has the opening 145 formed in a wall surface of the first cavity portion 142A of the first Helmholtz resonator 14A. The second Helmholtz resonator 14B is formed in a direction perpendicular to the wall surface surrounding the sound channel 131. The second Helmholtz resonator 14B is an example of a second resonator.

The second Helmholtz resonator 14B includes a second neck portion 141B and a second cavity portion 142B. The second neck portion 141B is formed in a periphery of the first cavity portion 142A of the first Helmholtz resonator 14A and has a space of a third volume smaller than the first volume. The second cavity portion 142B is formed in a periphery of the second neck portion 141B and has a space of a fourth volume larger than the third volume and smaller than the second volume. The second Helmholtz resonator 14B resonates with a sound of a specific frequency and reduces a peak mainly generated in a low frequency domain. A cross-sectional area of the opening 145 of the second neck portion 141B, a length of the second neck portion 141B, and the volume of the second cavity portion 142B are determined such that the peak is reduced by a resonance frequency.

The second neck portion 141B is an annular space surrounding the periphery of the first cavity portion 142A of the first Helmholtz resonator 14A. The second cavity portion 142B is an annular space surrounding the periphery of the second neck portion 141B.

In the fourth embodiment, the sizes of the first Helmholtz resonator 14A and the second Helmholtz resonator 14B decrease with increasing distances from the sound channel 131, but the present disclosure is not particularly limited thereto. The sizes of the first Helmholtz resonator 14A and the second Helmholtz resonator 14B may increase with increasing distances from the sound channel 131.

Here, description will be made of a method of forming the first Helmholtz resonator 14A and the second Helmholtz resonator 14B on the second substrate 13C with reference to FIG. 9.

Figure 9:
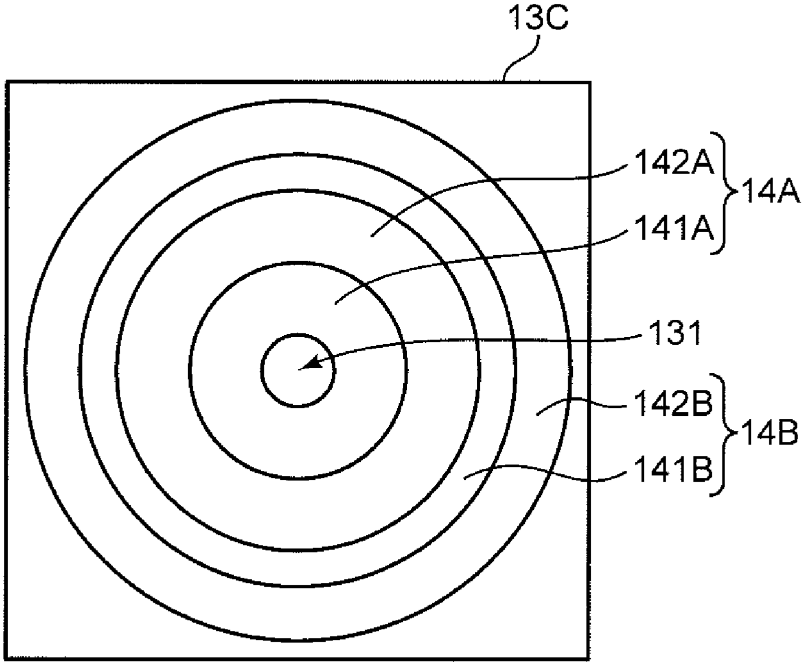
FIG. 9 is a top view of a second substrate in the fourth embodiment of the present disclosure.

FIG. 9 is a top view of the second substrate according to the fourth embodiment of the present disclosure.

First, a through hole is formed in a thickness direction of the second substrate 13C. The through hole formed in the second substrate 13C is the sound channel 131. Cross sections of an input side opening end and an output side opening end of the sound channel 131 are circular. The sound channel 131 is cylindrical. The input side opening end and the output side opening end of the sound channel 131 preferably have diameters equal to the diameter of the through hole 121 of the first substrate 12.

Next, an annular region from an outer edge of the sound channel 131 to a position corresponding to a horizontal length of the first neck portion 141A of the first Helmholtz resonator 14A is cut from a surface of the second substrate 13C to a position at a first depth. As a result, the first neck portion 141A of the first Helmholtz resonator 14A is formed.

Next, an annular region from an outer edge of the first neck portion 141A to a position corresponding to a horizontal length of the first cavity portion 142A of the first Helmholtz resonator 14A is cut from the surface of the second substrate 13C to a position at a second depth. As a result, the first cavity portion 142A of the first Helmholtz resonator 14A is formed. Note that the second depth of the first cavity portion 142A from the surface of the second substrate 13C is larger than the first depth of the first neck portion 141A from the surface of the second substrate 13C.

Next, an annular region from an outer edge of the first cavity portion 142A of the first Helmholtz resonator 14A to a position corresponding to a horizontal length of the second neck portion 141B of the second Helmholtz resonator 14B is cut from the surface of the second substrate 13C to a position at a third depth. As a result, the second neck portion 141B of the second Helmholtz resonator 14B is formed. Note that the third depth of the second neck portion 141B of the second Helmholtz resonator 14B from the surface of the second substrate 13C is smaller than the first depth of the first neck portion 141A of the first Helmholtz resonator 14A from the surface of the second substrate 13C.

Next, an annular region from an outer edge of the second neck portion 141B to a position corresponding to a horizontal length of the second cavity portion 142B of the second Helmholtz resonator 14B is cut from the surface of the second substrate 13C to a position at a fourth depth. As a result, the second cavity portion 142B of the second Helmholtz resonator 14B is formed. Note that the fourth depth of the second cavity portion 142B from the surface of the second substrate 13C is larger than the third depth of the second neck portion 141B of the second Helmholtz resonator 14B from the surface of the second substrate 13C and smaller than the second depth of the first cavity portion 142A of the first Helmholtz resonator 14A from the surface of the second substrate 13C.

Note that the first neck portion 141A and the first cavity portion 142A of the first Helmholtz resonator 14A may be formed by resin transfer processing instead of the above-described cutting processing. In addition, the second neck portion 141B and the second cavity portion 142B of the second Helmholtz resonator 14B may also be formed by resin transfer processing instead of the above-described cutting processing.

Next, a surface of the first substrate 12 opposed to a surface on which the microphone 10 is mounted (i.e., the surface on which the microphone 10 is not mounted) and a surface of the second substrate 13C in which the first Helmholtz resonator 14A and the second Helmholtz resonator 14B have been formed are bonded to each other. At this time, the first substrate 12 and the second substrate 13C are bonded to each other such that a central axis of the through hole 121 of the first substrate 12 and a central axis of the sound channel 131 of the second substrate 13C agree with each other. As a result, the first Helmholtz resonator 14A and the second Helmholtz resonator 14B are formed between the first substrate 12 and the second substrate 13C.

According to the fourth embodiment, since the first Helmholtz resonator 14A and the second Helmholtz resonator 14B having resonance frequencies different from each other are formed, peaks of a plurality of frequencies can be reduced.

Note that the sound channel 131 of the second substrate 13C in the fourth embodiment may be formed to be tapered from an input port of sound toward the inside of the sound channel 131 similarly to the second embodiment.

In addition, a sound absorbing material may be disposed inside at least one of the first neck portion 141A and the first cavity portion 142A of the first Helmholtz resonator 14A in the fourth embodiment similarly to the third embodiment. Further, a sound absorbing material may be disposed inside at least one of the second neck portion 141B and the second cavity portion 142B of the second Helmholtz resonator 14B in the fourth embodiment similarly to the third embodiment.

Subsequently, description will be made of various modifications of the shapes of the first Helmholtz resonator 14A and the second Helmholtz resonator 14B according to the fourth embodiment.

Figure 10:
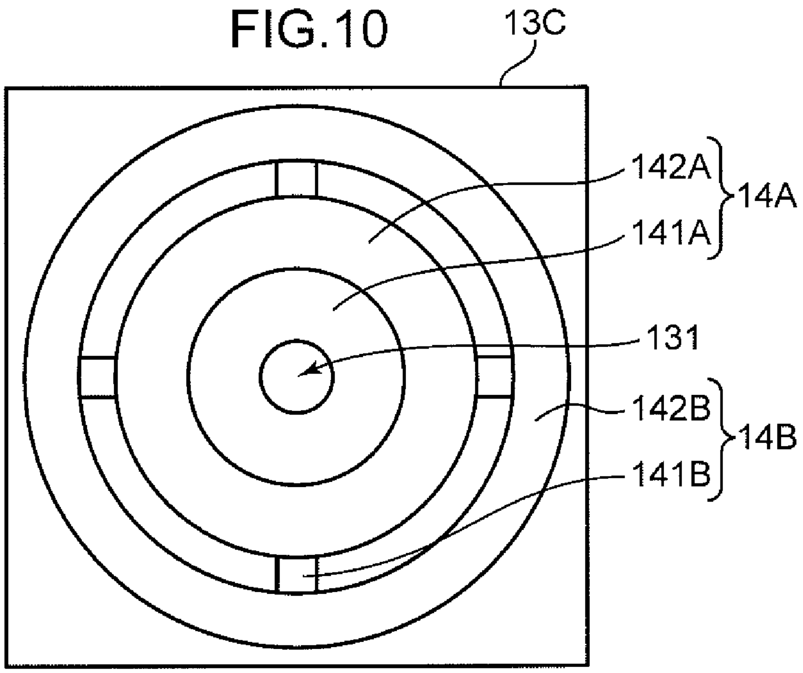
FIG. 10 is a top view of a second substrate in a first modification of the fourth embodiment of the present disclosure.

FIG. 10 is a top view of a second substrate according to a first modification of the fourth embodiment of the present disclosure.

A first Helmholtz resonator 14A in the first modification of the fourth embodiment has the same shape as the shape of the first Helmholtz resonator 14A in the fourth embodiment.

In contrast, a second Helmholtz resonator 14B in the first modification of the fourth embodiment includes at least one second neck portion 141B and a second cavity portion 142B. The at least one second neck portion 141B is a tubular space extending radially from a wall surface of a first cavity portion 142A of the first Helmholtz resonator 14A. Note that the second Helmholtz resonator 14B in the first modification of the fourth embodiment includes four second neck portions 141B. The second cavity portion 142B is an annular space surrounding a periphery of the at least one second neck portion 141B. One opening end of the at least one second neck portion 141B is connected to the first cavity portion 142A of the first Helmholtz resonator 14A, and the other opening end of the at least one second neck portion 141B is connected to the second cavity portion 142B.

An opening 145 of the second neck portion 141B may have a quadrangular cross section, and the second neck portion 141B may have a prismatic shape. In addition, the opening 145 of the second neck portion 141B may have a circular cross section, and the second neck portion 141B may have a cylindrical shape. Furthermore, the second neck portion 141B may have a fan shape that gradually expands from the opening end connected to the first cavity portion 142A of the first Helmholtz resonator 14A toward the opening end connected to the second cavity portion 142B.

Note that the number of the second neck portions 141B is not limited to four. For example, when the number of the second neck portions 141B decreases, a signal characteristic of a resonance frequency becomes steep, and when the number of the second neck portions 141B increases, the signal characteristic of the resonance frequency becomes gentle. Therefore, the second Helmholtz resonator 14B may include the number of the second neck portions 141B corresponding to sharpness (i.e., a Q value) of a signal characteristic of a peak frequency to be reduced. In addition, the second Helmholtz resonator 14B may include a plurality of second neck portions 141B having the openings 145 with different cross-sectional areas, according to the number of frequencies at which peaks are desired to be reduced.

In the first modification of the fourth embodiment, it is possible to improve a degree of freedom in designing a resonance frequency and sharpness of a signal characteristic of the resonance frequency by changing the number of the second neck portions 141B of the second Helmholtz resonator 14B. In addition, since the second Helmholtz resonator 14B includes the plurality of second neck portions 141B having the openings 145 with different cross-sectional areas, peaks of a plurality of frequencies can be reduced. In addition, since an area where a first substrate 12 and a second substrate 13C are in contact with each other becomes larger, a support strength of the first substrate 12 can be increased. As a result, vibration of a microphone 10 can be suppressed. In particular, the shape of the second Helmholtz resonator 14B in the first modification of the fourth embodiment exhibits a more remarkable effect in a case where the first substrate 12 is thin like a flexible substrate.

Figure 11:
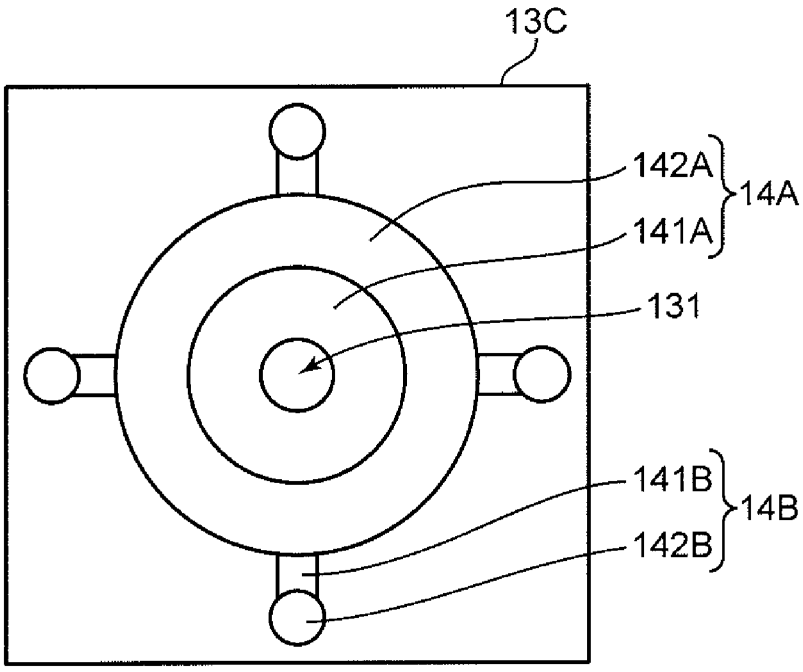
FIG. 11 is a top view of a second substrate in a second modification of the fourth embodiment of the present disclosure.

FIG. 11 is a top view of a second substrate according to a second modification of the fourth embodiment of the present disclosure.

A shape of a first Helmholtz resonator 14A in the second modification of the fourth embodiment is the same as the shape of the first Helmholtz resonator 14A in the fourth embodiment.

A second Helmholtz resonator 14B in the second modification of the fourth embodiment includes at least one second neck portion 141B and at least one second cavity portion 142B. The at least one second neck portion 141B is a tubular space extending radially from a wall surface of a first cavity portion 142A of the first Helmholtz resonator 14A. The at least one second cavity portion 142B is provided individually for the at least one second neck portion 141B. Note that the second Helmholtz resonator 14B in the second modification of the fourth embodiment includes four second neck portions 141B and four second cavity portions 142B. One opening end of the at least one second neck portion 141B is connected to the first cavity portion 142A of the first Helmholtz resonator 14A, and the other opening end of the at least one second neck portion 141B is connected to the at least one second cavity portion 142B.

An opening 145 of the second neck portion 141B may have a quadrangular cross section, and the second neck portion 141B may have a prismatic shape. In addition, the opening 145 of the second neck portion 141B may have a circular cross section, and the second neck portion 141B may have a cylindrical shape.

The second cavity portion 142B may have a quadrangular cross section, and the second cavity portion 142B may have a prismatic shape. In addition, the second cavity portion 142B may have a circular cross section, and the second cavity portion 142B may have a cylindrical shape. In addition, the second cavity portion 142B may be spherical.

Note that the numbers of the second neck portions 141B and the second cavity portions 142B are not limited to four. For example, when the number of the second neck portions 141B and the number of the second cavity portions 142B decrease, a signal characteristic of a resonance frequency becomes steep, and when the number of the second neck portions 141B and the number of the second cavity portions 142B increase, the signal characteristic of the resonance frequency becomes gentle. Therefore, the second Helmholtz resonator 14B may include the number of the second neck portions 141B and the number of the second cavity portions 142B corresponding to sharpness (i.e., a Q value) of a signal characteristic of a peak frequency to be reduced. In addition, the second Helmholtz resonator 14B may include a plurality of second neck portions 141B having the openings 145 with different cross-sectional areas, according to the number of frequencies at which peaks are to be reduced, and may include a plurality of second cavity portions 142B having different volumes.

In the second modification of the fourth embodiment, it is possible to improve a degree of freedom in designing a resonance frequency and sharpness of a signal characteristic of the resonance frequency by changing the number of the second neck portions 141B and the number of the second cavity portions 142B. In addition, since the second Helmholtz resonator 14B includes the plurality of second neck portions 141B having the openings 145 with different cross-sectional areas, peaks of a plurality of frequencies can be reduced. In addition, since the second Helmholtz resonator 14B includes the plurality of second cavity portions 142B having different volumes, peaks of a plurality of frequencies can be reduced. In addition, since an area where a first substrate 12 and a second substrate 13C are in contact with each other becomes larger, a support strength of the first substrate 12 can be increased. As a result, vibration of a microphone 10 can be suppressed. In particular, the shape of the second Helmholtz resonator 14B in the second modification of the fourth embodiment exhibits a more remarkable effect in a case where the first substrate 12 is thin like a flexible substrate.

Figure 12:
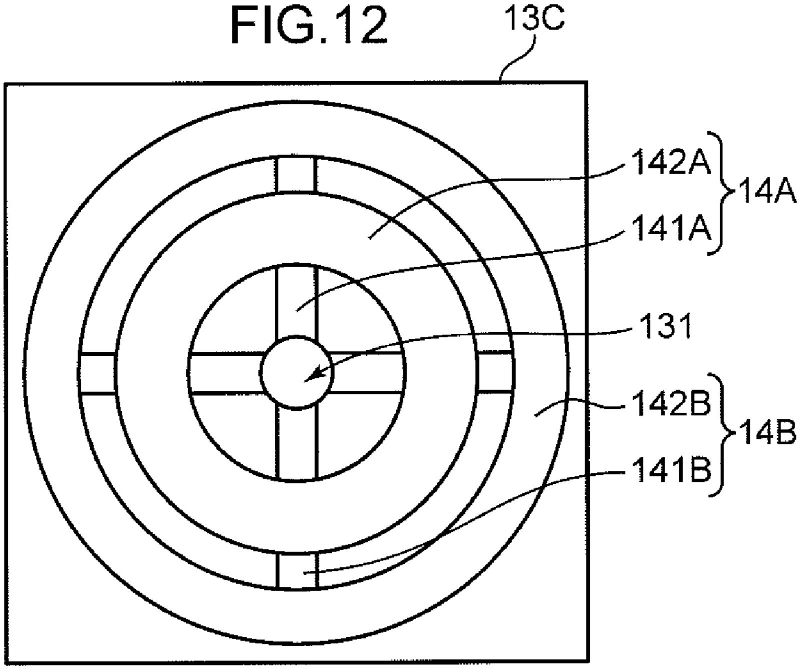
FIG. 12 is a top view of a second substrate in a third modification of the fourth embodiment of the present disclosure.

FIG. 12 is a top view of a second substrate according to a third modification of the fourth embodiment of the present disclosure.

A first Helmholtz resonator 14A in the third modification of the fourth embodiment includes at least one first neck portion 141A and a first cavity portion 142A. The at least one first neck portion 141A is a tubular space radially extending from a wall surface of a sound channel 131. Note that the first Helmholtz resonator 14A in the third modification of the fourth embodiment includes four first neck portions 141A. The first cavity portion 142A is an annular space surrounding a periphery of the at least one first neck portion 141A. One opening end of the at least one first neck portion 141A is connected to the sound channel 131, and the other opening end of the at least one first neck portion 141A is connected to the first cavity portion 142A.

An opening 143 of the first neck portion 141A may have a quadrangular cross section, and the first neck portion 141A may have a prismatic shape. In addition, the cross-sectional shape of the opening 143 of the first neck portion 141A may be circular, and the first neck portion 141A may have a cylindrical shape. Further, the first neck portion 141A may have a fan shape that gradually expands from the opening end connected to the sound channel 131 toward the opening end connected to the first cavity portion 142A.

Note that the number of the first neck portions 141A is not limited to four. For example, when the number of the first neck portions 141A decreases, a signal characteristic of a resonance frequency becomes steep, and when the number of the first neck portions 141A increases, the signal characteristic of the resonance frequency becomes gentle. Therefore, the first Helmholtz resonator 14A may include the number of the first neck portions 141A corresponding to sharpness (i.e., a Q value) of a signal characteristic of a peak frequency to be reduced. In addition, the first Helmholtz resonator 14A may include a plurality of first neck portions 141A having the openings 143 with different cross-sectional areas, according to the number of frequencies at which peaks are desired to be reduced.

A shape of a second Helmholtz resonator 14B in the third modification of the fourth embodiment is the same as the shape of the second Helmholtz resonator 14B in the first modification of the fourth embodiment.

In the third modification of the fourth embodiment, it is possible to improve a degree of freedom in designing a resonance frequency and sharpness of a signal characteristic of the resonance frequency by changing the number of the first neck portions 141A and the number of second neck portions 141B. In addition, since the first Helmholtz resonator 14A and the second Helmholtz resonator 14B include the plurality of first neck portions 141A and the plurality of second neck portions 141B having openings 143 and 145 with different cross-sectional areas, respectively, peaks of a plurality of frequencies can be reduced. In addition, since an area where a first substrate 12 and a second substrate 13C are in contact with each other becomes larger, a support strength of the first substrate 12 can be increased. As a result, vibration of a microphone 10 can be suppressed. In particular, the shapes of the first Helmholtz resonator 14A and the second Helmholtz resonator 14B in the third modification of the fourth embodiment exhibit a more remarkable effect in a case where the first substrate 12 is thin like a flexible substrate.

Figure 13:
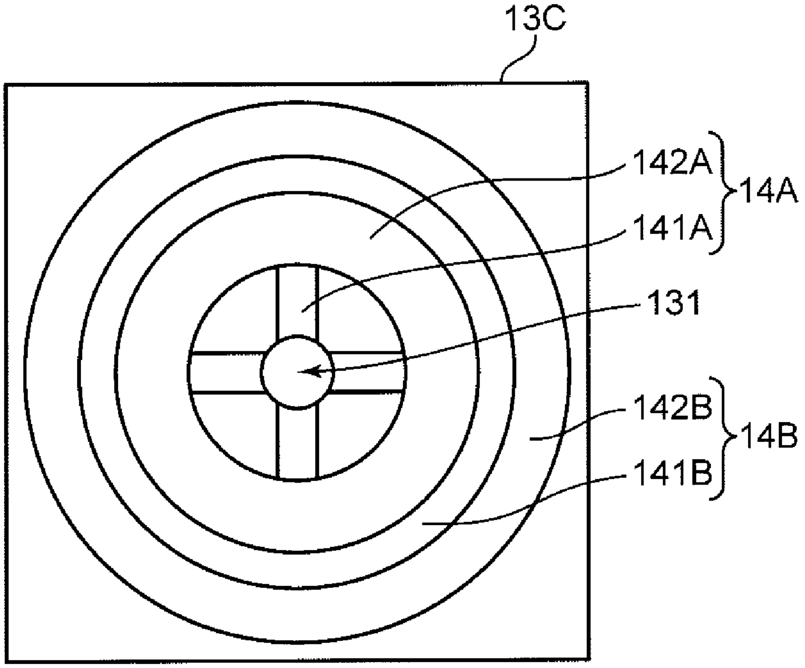
FIG. 13 is a top view of a second substrate in a fourth modification of the fourth embodiment of the present disclosure.

FIG. 13 is a top view of a second substrate according to a fourth modification of the fourth embodiment of the present disclosure.

A shape of a first Helmholtz resonator 14A in the fourth modification of the fourth embodiment is the same as the shape of the first Helmholtz resonator 14A in the third modification of the fourth embodiment.

In addition, a shape of a second Helmholtz resonator 14B in the fourth modification of the fourth embodiment is the same as the shape of the second Helmholtz resonator 14B in the fourth embodiment.

In the fourth modification of the fourth embodiment, it is possible to improve a degree of freedom in designing a resonance frequency and sharpness of a signal characteristic of the resonance frequency by changing the number of first neck portions 141A. In addition, since the first Helmholtz resonator 14A includes a plurality of first neck portions 141A having openings 143 with different cross-sectional areas, peaks of a plurality of frequencies can be reduced. In addition, since an area where a first substrate 12 and a second substrate 13C are in contact with each other becomes larger, a support strength of the first substrate 12 can be increased. As a result, vibration of a microphone 10 can be suppressed. In particular, the shape of the first Helmholtz resonator 14A in the fourth modification of the fourth embodiment exhibits a more remarkable effect in a case where the first substrate 12 is thin like a flexible substrate.

Figure 14:
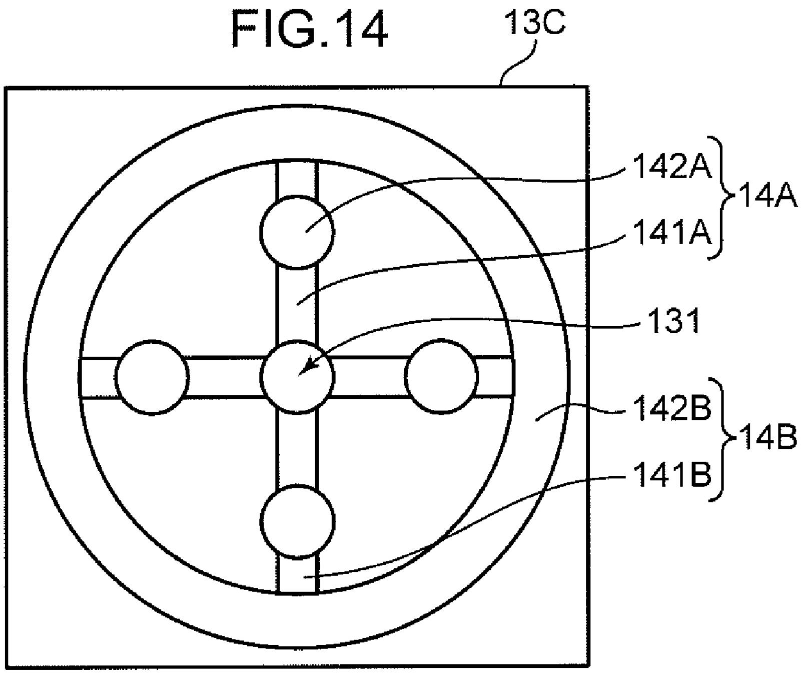
FIG. 14 is a top view of a second substrate in a fifth modification of the fourth embodiment of the present disclosure.

FIG. 14 is a top view of a second substrate according to a fifth modification of the fourth embodiment of the present disclosure.

A first Helmholtz resonator 14A in the fifth modification of the fourth embodiment includes at least one first neck portion 141A and at least one first cavity portion 142A. The at least one first neck portion 141A is a tubular space radially extending from a wall surface of a sound channel 131. The at least one first cavity portion 142A is provided individually for the at least one first neck portion 141A. Note that the first Helmholtz resonator 14A in the fifth modification of the fourth embodiment includes four first neck portions 141A and four first cavity portions 142A. One opening end of the at least one first neck portion 141A is connected to the sound channel 131, and the other opening end of the at least one first neck portion 141A is connected to the first cavity portion 142A.

An opening 143 of the first neck portion 141A may have a quadrangular cross section, and the first neck portion 141A may have a prismatic shape. In addition, the cross-sectional shape of the opening 143 of the first neck portion 141A may be circular, and the first neck portion 141A may have a cylindrical shape.

The first cavity portion 142A may have a quadrangular cross section, and the first cavity portion 142A may have a prismatic shape. In addition, the first cavity portion 142A may have a circular cross section, and the first cavity portion 142A may have a cylindrical shape. In addition, the first cavity portion 142A may be spherical.

Note that the number of the first neck portions 141A and the number of the first cavity portions 142A are not limited to four. For example, when the number of the first neck portions 141A and the number of the first cavity portions 142A decrease, a signal characteristic of a resonance frequency becomes steep, and when the number of the first neck portions 141A and the number of the first cavity portions 142A increase, the signal characteristic of the resonance frequency becomes gentle. Therefore, the first Helmholtz resonator 14A may include the number of the first neck portions 141A and the number of the first cavity portions 142A corresponding to sharpness (i.e., a Q value) of a signal characteristic of a peak frequency to be reduced. In addition, the first Helmholtz resonator 14A may include a plurality of first neck portions 141A having openings 143 with different cross-sectional areas, according to the number of frequencies at which a peak is to be reduced, and may include a plurality of first cavity portions 142A having different volumes.

A shape of a second Helmholtz resonator 14B in the fifth modification of the fourth embodiment is the same as the shape of the second Helmholtz resonator 14B in the first modification of the fourth embodiment.

The second Helmholtz resonator 14B in the fifth modification of the fourth embodiment includes at least one second neck portion 141B and a second cavity portion 142B. The at least one second neck portion 141B is a tubular space extending radially from a wall surface of the at least one first cavity portion 142A of the first Helmholtz resonator 14A. Note that the second Helmholtz resonator 14B in the fifth modification of the fourth embodiment includes four second neck portions 141B. The second cavity portion 142B is an annular space surrounding a periphery of the at least one second neck portion 141B. One opening end of the at least one second neck portion 141B is connected to the at least one first cavity portion 142A of the first Helmholtz resonator 14A, and the other opening end of the at least one second neck portion 141B is connected to the second cavity portion 142B.

In the fifth modification of the fourth embodiment, it is possible to improve a degree of freedom in designing a resonance frequency and sharpness of a signal characteristic of the resonance frequency by changing the number of the first neck portions 141A and the number of the first cavity portions 142A. In addition, since the first Helmholtz resonator 14A includes a plurality of first neck portions 141A having openings 143 with different cross-sectional areas, peaks of a plurality of frequencies can be reduced. In addition, since the first Helmholtz resonator 14A includes the plurality of first cavity portions 142A having different volumes, peaks of a plurality of frequencies can be reduced. In addition, it is possible to improve the degree of freedom in designing a resonance frequency and sharpness of a signal characteristic of the resonance frequency by changing the number of the second neck portions 141B of the second Helmholtz resonator 14B. In addition, since the second Helmholtz resonator 14B includes the plurality of second neck portions 141B having the openings 145 with different cross-sectional areas, peaks of a plurality of frequencies can be reduced. In addition, since an area where a first substrate 12 and a second substrate 13C are in contact with each other becomes larger, a support strength of the first substrate 12 can be increased. As a result, vibration of a microphone 10 can be suppressed. In particular, the shapes of the first Helmholtz resonator 14A and the second Helmholtz resonator 14B in the fifth modification of the fourth embodiment exhibit a more remarkable effect in a case where the first substrate 12 is thin like a flexible substrate.

Figure 15:
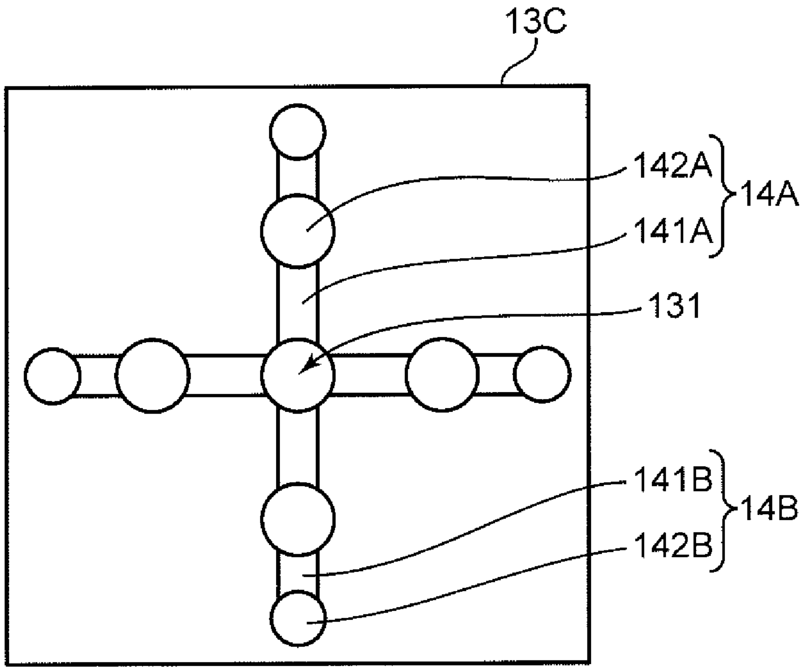
FIG. 15 is a top view of a second substrate in a sixth modification of the fourth embodiment of the present disclosure.

FIG. 15 is a top view of a second substrate according to a sixth modification of the fourth embodiment of the present disclosure.

A shape of a first Helmholtz resonator 14A in the sixth modification of the fourth embodiment is the same as the shape of the first Helmholtz resonator 14A in the fifth modification of the fourth embodiment.

A shape of a second Helmholtz resonator 14B in the sixth modification of the fourth embodiment is the same as the shape of the second Helmholtz resonator 14B in the second modification of the fourth embodiment.

The second Helmholtz resonator 14B in the sixth modification of the fourth embodiment includes at least one second neck portion 141B and at least one second cavity portion 142B. The at least one second neck portion 141B is a tubular space extending radially from a wall surface of the at least one first cavity portion 142A of the first Helmholtz resonator 14A. The at least one second cavity portion 142B is provided individually for the at least one second neck portion 141B. Note that the second Helmholtz resonator 14B in the sixth modification of the fourth embodiment includes four second neck portions 141B and four second cavity portions 142B. One opening end of the at least one second neck portion 141B is connected to the at least one first cavity portion 142A of the first Helmholtz resonator 14A, and the other opening end of the at least one second neck portion 141B is connected to the at least one second cavity portion 142B.

In the sixth modification of the fourth embodiment, it is possible to improve a degree of freedom in designing a resonance frequency and sharpness of a signal characteristic of the resonance frequency by changing the numbers of first neck portions 141A and the first cavity portions 142A of the first Helmholtz resonator 14A. In addition, since the first Helmholtz resonator 14A includes a plurality of first neck portions 141A having openings 143 with different cross-sectional areas, peaks of a plurality of frequencies can be reduced. In addition, since the first Helmholtz resonator 14A includes the plurality of first cavity portions 142A having different volumes, peaks of a plurality of frequencies can be reduced. In addition, it is possible to improve the degree of freedom in designing a resonance frequency and sharpness of a signal characteristic of the resonance frequency by changing the numbers of the second neck portions 141B and the second cavity portions 142B of the second Helmholtz resonator 14B. In addition, since the second Helmholtz resonator 14B includes the plurality of second neck portions 141B having the openings 145 with different cross-sectional areas, peaks of a plurality of frequencies can be reduced. In addition, since the second Helmholtz resonator 14B includes the plurality of second cavity portions 142B having different volumes, peaks of a plurality of frequencies can be reduced. In addition, since an area where a first substrate 12 and a second substrate 13C are in contact with each other becomes larger, a support strength of the first substrate 12 can be increased. As a result, vibration of a microphone 10 can be suppressed. In particular, the shapes of the first Helmholtz resonator 14A and the second Helmholtz resonator 14B in the sixth modification of the fourth embodiment exhibit a more remarkable effect in a case where the first substrate 12 is thin like a flexible substrate.

In the sixth modification of the fourth embodiment, one second neck portion 141B of the second Helmholtz resonator 14B is connected to one first cavity portion 142A of the first Helmholtz resonator 14A, but the present disclosure is not particularly limited thereto. The plurality of second neck portions 141B of the second Helmholtz resonator 14B may be connected to one first cavity portion 142A of the first Helmholtz resonator 14A.

Fifth Embodiment

The microphone in the first embodiment is a bottom port type MEMS microphone in which a sound hole is formed on a first substrate side under the microphone. In contrast, the microphone according to the fifth embodiment is a top port type MEMS microphone in which a sound hole is formed in a cover in an upper portion of the microphone.

Figure 16:
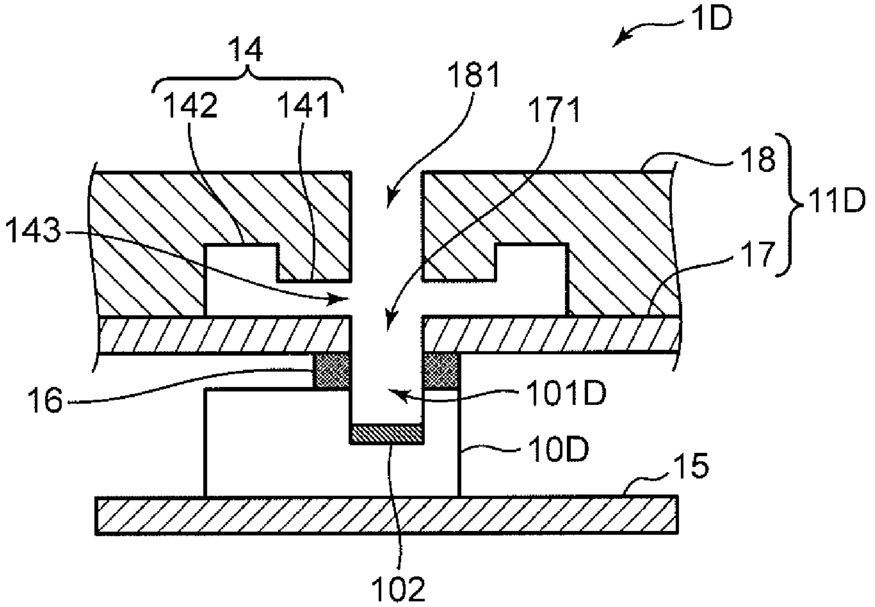
FIG. 16 is a sectional view illustrating a configuration of a sound pickup device according to a fifth embodiment of the present disclosure.

FIG. 16 is a sectional view illustrating a configuration of a sound pickup device according to the fifth embodiment of the present disclosure.

A sound pickup device 1D illustrated in FIG. 16 includes a microphone 10D, an acoustic member 11D, a Helmholtz resonator 14, a substrate 15, and a gasket 16. In the fifth embodiment, the same components as those in the first embodiment are denoted by the same reference numerals, and description thereof will be omitted.

The microphone 10D is a MEMS microphone. The microphone 10D includes an electronic component and a cover that covers the electronic component. A sound hole 101D for guiding sound into the microphone 10D is formed in the cover.

The sound hole 101D in the fifth embodiment is formed in the cover in an upper portion of the microphone 10D. The microphone 10D in the fifth embodiment is a top port type MEMS microphone.

A diaphragm 102 is disposed inside the microphone 10D in which the sound hole 101D is formed.

A substrate 15 is mounted with the microphone 10D such that a surface of the microphone opposed to a surface on which the sound hole 101D is formed is in contact with the substrate. The microphone 10D is mounted on the substrate 15.

Although the diaphragm 102 illustrated in FIG. 16 is mounted on the cover (lid) in the upper portion of the microphone 10D, the present disclosure is not particularly limited thereto. The diaphragm 102 may be mounted on the substrate 15 below the microphone 10D.

The acoustic member 11D has a sound channel 181 formed to guide sound to the diaphragm 102. The acoustic member 11D includes a first housing 17 and a second housing 18.

The first housing 17 has a through hole 171 formed at the same position as the sound hole 101D of the microphone 10D, and is attached to the microphone 10D. Note that the first housing 17 is an example of a first acoustic member.

The second housing 18 has a sound channel 181 formed at a position corresponding to the through hole 171 of the first housing 17, and is attached to the first housing 17. Note that the second housing 18 is an example of a second acoustic member. The first housing 17 and the second housing 18 are housings of an electric apparatus including the sound pickup device 1D.

The gasket 16 is disposed between the microphone 10D and the first housing 17 to connect the microphone 10D and the first housing 17. The gasket 16 prevents sound input to the sound channel 181 from leaking. Note that the sound pickup device 1D may not include the gasket 16, and the microphone 10D may be directly attached to the first housing 17 without the gasket 16.

One surface of the first housing 17 is bonded to the surface of the microphone 10D on which the sound hole 101D is formed via the gasket 16. The other surface of the first housing 17 is bonded to a surface of the second housing 18 in which the Helmholtz resonator 14 is formed.

The Helmholtz resonator 14 has an opening 143 formed in a wall surface surrounding the sound channel 181. The Helmholtz resonator 14 is formed in a direction perpendicular to the wall surface surrounding the sound channel 181. The Helmholtz resonator 14 is an example of a resonator. The shape of the Helmholtz resonator 14 in the fifth embodiment is the same as the shape of the Helmholtz resonator 14 in the first embodiment.

According to the fifth embodiment, even when the microphone 10D is a top port type MEMS microphone, the Helmholtz resonator 14 enables a peak generated in an ultrasonic band to be reduced and a frequency characteristic to be substantially flat.

Note that the sound channel 181 of the second housing 18 in the fifth embodiment may be formed to be tapered from an input port of sound toward the inside of the sound channel 181 similarly to the second embodiment.

In addition, a sound absorbing material may be disposed inside at least one of a neck portion 141 and a cavity portion 142 of the Helmholtz resonator 14 in the fifth embodiment similarly to the third embodiment.

In addition, the sound pickup device 1D according to the fifth embodiment may include a first Helmholtz resonator 14A and a second Helmholtz resonator 14B similarly to the fourth embodiment.

Although the Helmholtz resonator 14 in the fifth embodiment is formed in the second housing 18, the present disclosure is not particularly limited thereto, and the Helmholtz resonator 14 may be formed in the first housing 17 instead of the second housing 18. In this case, one surface of the second housing 18 in which the through hole is formed and one surface of the first housing 17 in which the Helmholtz resonator 14 is formed are bonded to each other.

Sixth Embodiment

In the first embodiment, the Helmholtz resonator 14 is formed outside the microphone. In contrast, in a sixth embodiment, a Helmholtz resonator 14 is formed inside a microphone.

Figure 17:
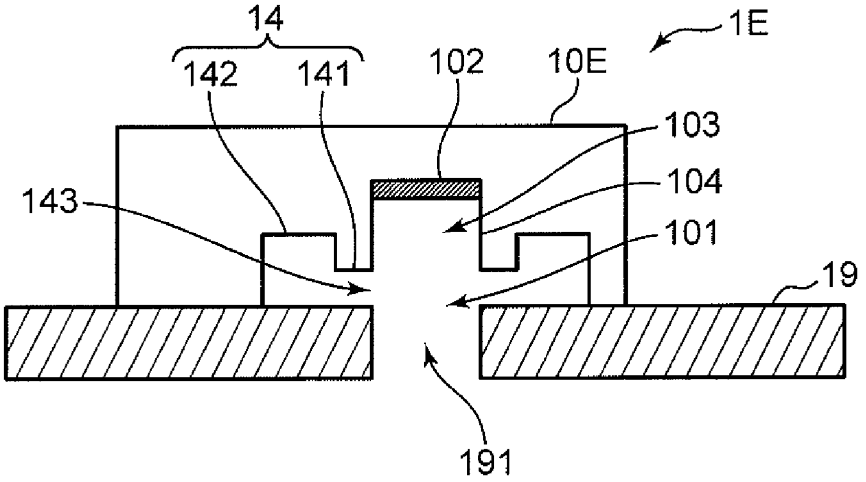
FIG. 17 is a sectional view illustrating a configuration of a sound pickup device according to a sixth embodiment of the present disclosure.

FIG. 17 is a sectional view illustrating a configuration of a sound pickup device according to the sixth embodiment of the present disclosure.

A sound pickup device 1E illustrated in FIG. 17 includes a microphone 10E and a substrate 19. In the sixth embodiment, the same components as those in the first embodiment are denoted by the same reference numerals, and description thereof will be omitted.

The microphone 10E includes a diaphragm 102, a support member 104, and a Helmholtz resonator 14.

The diaphragm 102 is disposed inside the microphone 10E in which a sound hole 101 is formed.

The support member 104 is disposed between the sound hole 101 and the diaphragm 102. The support member 104 supports the diaphragm 102. The support member 104 has a sound channel 103 formed to guide sound to the diaphragm 102. Note that the support member 104 is an example of an acoustic member.

The Helmholtz resonator 14 has an opening 143 formed in a wall surface surrounding the sound channel 103. The Helmholtz resonator 14 is formed in a direction perpendicular to the wall surface surrounding the sound channel 103. The Helmholtz resonator 14 is an example of a resonator. The Helmholtz resonator 14 in the sixth embodiment has the same shape as the shape of the Helmholtz resonator 14 in the first embodiment.

A substrate 19 has a through hole 191 formed at the same position as the sound hole 101, and is attached to the microphone 10E. The substrate 19 may be a rigid substrate or a flexible substrate. The microphone 10E is mounted on one surface of the substrate 19. The through hole 191 has, for example, a circular cross section. The through hole 191 preferably has the same diameter as the diameter of the sound hole 101 of the microphone 10E.

According to the sixth embodiment, since the Helmholtz resonator 14 is formed inside the microphone 10E, the sound pickup device 1E can be downsized.

Note that a sound absorbing material may be disposed inside at least one of a neck portion 141 and a cavity portion 142 of the Helmholtz resonator 14 in the sixth embodiment similarly to the third embodiment.

In addition, the sound pickup device 1E according to the sixth embodiment may include a first Helmholtz resonator 14A and a second Helmholtz resonator 14B similarly to the fourth embodiment.

Although the microphone 10E in the sixth embodiment is a bottom port type MEMS microphone, the present disclosure is not particularly limited thereto, and the microphone 10E may be a top port type MEMS microphone similarly to the fifth embodiment.

Seventh Embodiment

The microphone in the first embodiment is a MEMS microphone. In contrast, the microphone in a seventh embodiment is an electret condenser microphone.

Figure 18:
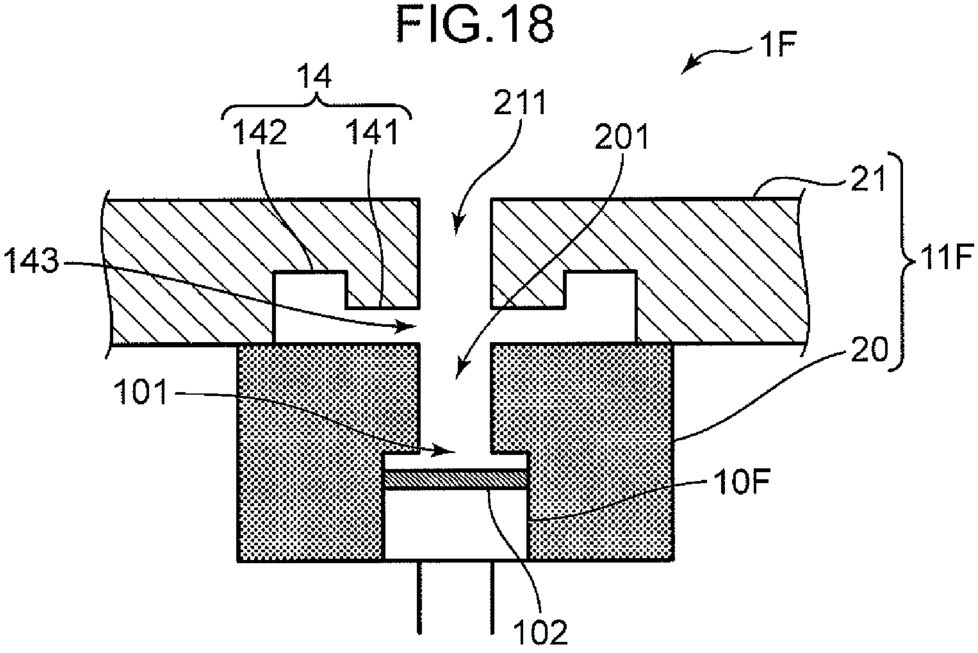
FIG. 18 is a sectional view illustrating a configuration of a sound pickup device according to a seventh embodiment of the present disclosure.

FIG. 18 is a sectional view illustrating a configuration of a sound pickup device according to the seventh embodiment of the present disclosure.

A sound pickup device 1F illustrated in FIG. 18 includes a microphone 10F, an acoustic member 11F, and a Helmholtz resonator 14. In the seventh embodiment, the same components as those in the first embodiment are denoted by the same reference numerals, and description thereof will be omitted.

The microphone 10F is an electret condenser microphone. The microphone 10F includes an electronic component and a cover that covers the electronic component. A sound hole 101 for guiding sound into the microphone 10F is formed in the cover. The electronic component includes, for example, a diaphragm 102 and an audio amplifier (not illustrated). The diaphragm 102 vibrates according to an acoustic pressure of input sound. The sound hole 101 has, for example, a circular cross section.

The diaphragm 102 is disposed inside the microphone 10F in which the sound hole 101 is formed. The diaphragm 102 vibrates by an acoustic pressure of sound input from the sound hole 101. The diaphragm 102 configures a capacitor together with a conductive plate disposed to be opposed to the diaphragm. When the diaphragm 102 vibrates by the acoustic pressure, capacitance of the capacitor changes. The changed capacitance is converted into an electric signal. The converted electric signal is amplified by the audio amplifier and output to the outside.

The acoustic member 11F has a sound channel 211 formed to guide sound to the diaphragm 102. The acoustic member 11F includes a covering member 20 and a housing 21.

The covering member 20 is, for example, an elastic member such as rubber, and absorbs vibration to the microphone 10F. The covering member 20 has a through hole 201 formed at the same position as the sound hole 101, and is attached to a periphery of the microphone 10F. Note that the covering member 20 is an example of a first acoustic member. The through hole 201 has, for example, a circular cross section. The through hole 201 preferably has the same diameter as the diameter of the sound hole 101 of the microphone 10F.

The housing 21 has the sound channel 211 formed at a position corresponding to the through hole 201, and is attached to the covering member 20. Note that the housing 21 is an example of a second acoustic member. The housing 21 is a housing of an electric apparatus including the sound pickup device 1F. Cross sections of an input side opening end and an output side opening end of the sound channel 211 are circular. The sound channel 211 has a cylindrical shape. The input side opening end and the output side opening end of the sound channel 211 preferably have the same diameters as the diameter of the through hole 201 of the covering member 20. The covering member 20 is bonded to a surface of the housing 21 in which the Helmholtz resonator 14 is formed.

The Helmholtz resonator 14 has an opening 143 formed in a wall surface surrounding the sound channel 211. The Helmholtz resonator 14 is formed in a direction perpendicular to the wall surface surrounding the sound channel 211. The Helmholtz resonator 14 is an example of a resonator. The Helmholtz resonator 14 in the seventh embodiment has the same shape as the shape of the Helmholtz resonator 14 in the first embodiment.

According to the seventh embodiment, even when the microphone 10F is an electret condenser microphone, the Helmholtz resonator 14 enables a peak generated in an ultrasonic band to be reduced and a frequency characteristic to be substantially flat.

Note that the sound channel 211 of the housing 21 in the seventh embodiment may be formed to be tapered from an input port of sound toward the inside of the sound channel 211 similarly to the second embodiment.

In addition, a sound absorbing material may be disposed inside at least one of a neck portion 141 and a cavity portion 142 of the Helmholtz resonator 14 in the seventh embodiment similarly to the third embodiment.

In addition, the sound pickup device 1F according to the seventh embodiment may include a first Helmholtz resonator 14A and a second Helmholtz resonator 14B similarly to the fourth embodiment.

Next, a sound pickup device according to a modification of the seventh embodiment will be described.

The Helmholtz resonator 14 in the seventh embodiment is formed in the housing 21 (second acoustic member). In contrast, a Helmholtz resonator 14 in the modification of the seventh embodiment is formed in a covering member 20 (first acoustic member).

Figure 19:
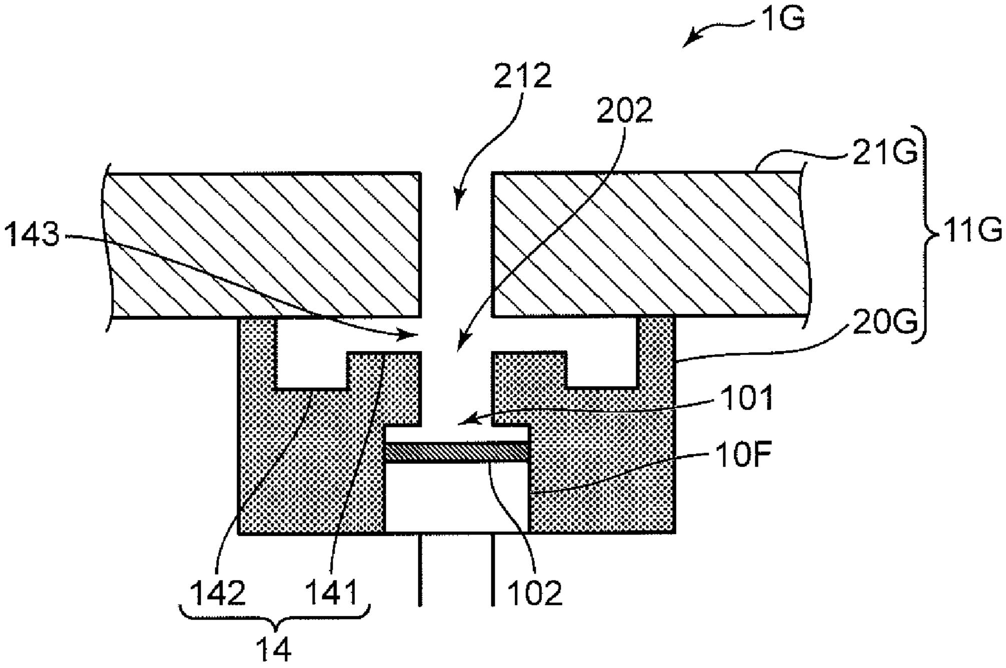
FIG. 19 is a cross-sectional view illustrating a configuration of a sound pickup device in a modification of the seventh embodiment of the present disclosure.

FIG. 19 is a sectional view illustrating a configuration of the sound pickup device according the modification of the seventh embodiment of the present disclosure.

A sound pickup device 1G illustrated in FIG. 19 includes a microphone 10F, an acoustic member 11G, and a Helmholtz resonator 14. In the modification of the seventh embodiment, the same components as those of the first and seventh embodiments are denoted by the same reference numerals, and description thereof will be omitted.

The acoustic member 11G has a sound channel 202 formed to guide sound to a diaphragm 102. The acoustic member 11G includes a covering member 20G and a housing 21G.

The covering member 20G is, for example, an elastic member such as rubber, and absorbs vibration to the microphone 10F. The covering member 20G has the sound channel 202 formed at a position corresponding to a sound hole 101, and is attached to a periphery of the microphone 10F. Note that the covering member 20G is an example of a first acoustic member.

The housing 21G has a through hole 212 formed at the same position as an input port of sound of the sound channel 202, and is attached to the covering member 20G. Note that the housing 21G is an example of a second acoustic member. The housing 21G is a housing of an electric apparatus including the sound pickup device 1G. The housing 21G is bonded to a surface of the covering member 20 in which the Helmholtz resonator 14 is formed.

Cross sections of an input side opening end and an output side opening end of the sound channel 202 are circular. The sound channel 202 has a cylindrical shape. The input side opening end and the output side opening end of the sound channel 202 preferably have the same diameters as the diameter of the sound hole 101 of the microphone 10F. The through hole 212 has, for example, a circular cross section. The through hole 212 preferably has the same diameter as the diameter of the input side opening end of the sound channel 202.

The Helmholtz resonator 14 has an opening 143 formed in a wall surface surrounding the sound channel 202. The Helmholtz resonator 14 is formed in a direction perpendicular to the wall surface surrounding the sound channel 202. The Helmholtz resonator 14 is an example of a resonator. The shape of the Helmholtz resonator 14 in the modification of the seventh embodiment is the same as the shape of the Helmholtz resonator 14 in the first embodiment.

According to the modification of the seventh embodiment, even when the microphone 10F is an electret condenser microphone, the Helmholtz resonator 14 enables a peak generated in an ultrasonic band to be reduced and a frequency characteristic to be substantially flat. In addition, since the Helmholtz resonator 14 is formed in the covering member 20G covering the microphone 10F, the Helmholtz resonator 14 can be easily formed and processed, and the existing housing 21G can be used.

Note that the through hole 212 of the housing 21G according to the modification of the seventh embodiment may be tapered from the input port of sound toward the inside of the through hole 212 similarly to the second embodiment.

In addition, a sound absorbing material may be disposed inside at least one of a neck portion 141 and a cavity portion 142 of the Helmholtz resonator 14 according to the modification of the seventh embodiment similarly to the third embodiment.

The sound pickup device 1G according to the modification of the seventh embodiment may include a first Helmholtz resonator 14A and a second Helmholtz resonator 14B similarly to the fourth embodiment.

INDUSTRIAL APPLICABILITY

The technique according to the present disclosure is useful as a technique for picking up sound using a microphone because it is possible to reduce a peak generated in an ultrasonic band and to prevent a decrease in sensitivity in the whole frequency band.

The invention claimed is:

1. A sound pickup device, comprising:
   - a diaphragm that vibrates according to an acoustic pressure of input sound;
   - an acoustic member having a sound channel formed to guide sound to the diaphragm; and
   - a resonator having an opening formed in a wall surface surrounding the sound channel, wherein
   - the diaphragm is disposed inside a microphone in which a sound hole is formed,
   - the acoustic member includes:
     - a first acoustic member that has a through hole formed at a same position as the sound hole, and is attached to the microphone; and a second acoustic member that has the sound channel formed at a position corresponding to the through hole, and is attached to the first acoustic member, the resonator is formed in a direction perpendicular to the wall surface surrounding the sound channel, and the sound channel of the second acoustic member is formed to be tapered from an input port of the sound toward an inside of the sound channel.

2. The sound pickup device according to claim 1, wherein the resonator is a Helmholtz resonator.

3. The sound pickup device according to claim 1, wherein the resonator includes:

a neck portion formed in a periphery of the sound channel and having a space of a first volume; and a cavity portion formed in a periphery of the neck portion and having a space of a second volume larger than the first volume.

4. The sound pickup device according to claim 3, wherein the neck portion is an annular space surrounding the periphery of the sound channel, and the cavity portion is an annular space surrounding the periphery of the neck portion.

5. The sound pickup device according to claim 3, wherein the neck portion is a tubular space radially extending from the wall surface of the sound channel, and the cavity portion is an annular space surrounding the periphery of the neck portion.

6. The sound pickup device according to claim 3, wherein the neck portion is a tubular space radially extending from the wall surface of the sound channel, and the cavity portion is provided individually for the neck portion.

7. The sound pickup device according to claim 3, further comprising a sound absorbing material disposed inside at least one of the neck portion and the cavity portion.

8. The sound pickup device according to claim 1, wherein the resonator includes:

a first resonator formed in a direction perpendicular to the wall surface surrounding the sound channel; and a second resonator formed outside the first resonator and having an opening connected to the first resonator.

9. The sound pickup device according to claim 1, wherein the microphone is a micro electro mechanical systems (MEMS) microphone.

10. A sound pickup device, comprising:

a diaphragm that vibrates according to an acoustic pressure of input sound;

an acoustic member having a sound channel formed to guide sound to the diaphragm; and a resonator having an opening formed in a wall surface surrounding the sound channel, wherein the diaphragm is disposed inside a microphone in which a sound hole is formed, the sound pickup device further comprises:

a substrate mounted with the microphone such that a surface of the microphone opposed to a surface on which the sound hole is formed is in contact with the substrate, the acoustic member includes:

a first acoustic member that has a through hole formed at a same position as the sound hole, and is attached to the microphone; and a second acoustic member that has the sound channel formed at a position corresponding to the through hole, and is attached to the first acoustic member, and the resonator is formed in a direction perpendicular to the wall surface surrounding the sound channel.

11. A sound pickup device, comprising:

a diaphragm that vibrates according to an acoustic pressure of input sound;

an acoustic member having a sound channel formed to guide sound to the diaphragm; and a resonator having an opening formed in a wall surface surrounding the sound channel, wherein the resonator includes:

a neck portion formed in a periphery of the sound channel and having a first space of a first volume; and a cavity portion formed in a periphery of the neck portion and having a second space of a second volume larger than the first volume, the neck portion is an annular space surrounding the periphery of the sound channel, and the cavity portion is an annular space surrounding the periphery of the neck portion.

12. A sound pickup device, comprising:

a diaphragm that vibrates according to an acoustic pressure of input sound;

an acoustic member having a sound channel formed to guide sound to the diaphragm; and a resonator having an opening formed in a wall surface surrounding the sound channel, wherein the resonator includes:

a neck portion formed in a periphery of the sound channel and having a first space of a first volume; and a cavity portion formed in a periphery of the neck portion and having a second space of a second volume larger than the first volume, the neck portion is a tubular space radially extending from the wall surface of the sound channel, and the cavity portion is an annular space surrounding the periphery of the neck portion.

* * * * *